US012121850B2

(12) United States Patent
Sigfússon et al.

(10) Patent No.: US 12,121,850 B2
(45) Date of Patent: Oct. 22, 2024

(54) METHOD OF ABATING CARBON DIOXIDE AND HYDROGEN SULFIDE

(71) Applicants: Carbfix, Reykjavik (IS); UNIVERSITY OF ICELAND, Reykjavik (IS); THE TRUSTEES OF COLUMBIA UNIVERSITY IN THE CITY OF NEW YORK, New York, NY (US); BARNARD COLLEGE, New York, NY (US)

(72) Inventors: Bergur Sigfússon, Reykjavik (IS); Edda Sif Pind Aradóttir, Reykjavik (IS); Ingvi Gunnarsson, Reykjavik (IS); Magnus þór Arnarson, Reykjavik (IS); Einar Gunnlaugsson, Reykjavik (IS); Hólmfridur Sigurdardóttir, Reykjavik (IS); Húni Sighvatsson, Reykjavik (IS); Sigurdur Reynir Gíslason, Reykjavik (IS); Eric H. Oelkers, Toulouse (FR); Kiflom G. Mesfin, Reykjanesbrer (IS); Sandra Ósk Snæbjörnsdóttir, Reykjavik (IS); Iwona M. Galeczka, Kopavogur (IS); Domenik Wolff-Boenisch, Coolbellup (AU); Helgi A. Alfredsson, Myvatni (IS); Porsteinn Jónsson, Reykjavik (IS); Andri Stefánsson, Reykjavik (IS); Jürg Matter, Winchester (GB); Martin Stute, New York, NY (US); Deirdre Elizabeth Clark, Reykjavik (IS); Martin Johannes Voigt, Sturlugata (IS)

(73) Assignee: Carbfix, Reykjavik (IS)

(*) Notice: Subject to any disclaimer, the term of this patent is extended or adjusted under 35 U.S.C. 154(b) by 62 days.

(21) Appl. No.: 17/595,572

(22) PCT Filed: May 22, 2020

(86) PCT No.: PCT/EP2020/064306
§ 371 (c)(1),
(2) Date: Nov. 19, 2021

(87) PCT Pub. No.: WO2020/234464
PCT Pub. Date: Nov. 26, 2020

(65) Prior Publication Data
US 2022/0219112 A1    Jul. 14, 2022

(30) Foreign Application Priority Data

May 22, 2019  (EP) .................................. 19175986

(51) Int. Cl.
*E21B 41/00* (2006.01)
*B01D 53/14* (2006.01)
(Continued)

(52) U.S. Cl.
CPC ..... *B01D 53/1475* (2013.01); *B01D 53/1412* (2013.01); *B01D 53/1468* (2013.01);
(Continued)

(58) Field of Classification Search
CPC ....... B65G 5/00; E21B 41/0064; E21B 47/11; Y02C 20/40
See application file for complete search history.

(56) References Cited

U.S. PATENT DOCUMENTS 4,632,601 A    12/1986  Kuwada
7,588,943 B2   9/2009   Prinzhofer et al.
(Continued)

FOREIGN PATENT DOCUMENTS

WO    2009061187 A2    9/2009

OTHER PUBLICATIONS

R.S. Gislason et al., "Mineral sequestration of carbon dioxide in basalt: A pre-injection overview of the CarbFix project" International Journal of Greenhouse Gas Control, Elsevier, Amsterdam, NL, vol. 4, No. 3, May 1, 2010, pp. 537-545.
(Continued)

*Primary Examiner* — Sean D Andrish
(74) *Attorney, Agent, or Firm* — Haynes and Boone, LLP

(57) ABSTRACT

This invention relates to a method and a system of abating carbon dioxide ($CO_2$) and/or hydrogen sulfide ($H_2S$) in a geological reservoir. Water is pumped or transferred from a water source to an injection well. The gasses are merged with the water under conditions where the hydraulic pressure of the water is less than the pressure of $CO_2$ and/or $H_2S$ gas at the merging point. The water with $CO_2$ and/or $H_2S$ gas bubbles is transferred further downwardly at a certain velocity higher than the upward flow velocity of said $CO_2$ and/or $H_2S$ gas bubbles ensuring downward movement of gas
(Continued)

bubbles resulting in full dissolution of said $CO_2$ and/or $H_2S$ in the water due to elevating pressure. The complete dissolution ensures a lowered pH of the water entering a geological (e.g. geothermal) reservoir which is needed to promote mineral reactions leading to $CO_2$ and $H_2S$ abatement This abatement may be quantified by dissolving a tracer substance in a predetermined molar ratio to said dissolved $CO_2$ and/or $H_2S$ and monitored in a monitoring well.

9 Claims, 11 Drawing Sheets

(51) Int. Cl.
    *B65G 5/00*         (2006.01)
    *E21B 47/11*      (2012.01)

(52) U.S. Cl.
    CPC ............ *B65G 5/00* (2013.01); *E21B 41/0064* (2013.01); *E21B 47/11* (2020.05); *B01D 2252/103* (2013.01); *Y02C 20/40* (2020.08)

(56) References Cited

U.S. PATENT DOCUMENTS

| | | | |
|---|---|---|---|
| 7,704,746 B1 * | 4/2010 | White ..................... | G01M 3/20 |
| | | | 436/56 |
| 2009/0202304 A1 | 8/2009 | Koide | |
| 2014/0186119 A1 * | 7/2014 | Dusseault ........... | E21B 41/0064 |
| | | | 405/129.2 |

OTHER PUBLICATIONS

International Search Report issued May 22, 2020 in PCT/EP2020/064306.
Broecker W.S., Kunzig, R., 2008. Fixing climate: what past climate changes reveal about the current threat—and how to counter it. Hill and Wang, New York; Oelkers, E.H., Cole, D.
Barbier, E. (2002) Geothermal Energy Technology and Current Status: an Overview. Renewable and Sustainable Energy Reviews, 6, p. 3-65.
Arnórsson, S. (1995a) Hydrothermal systems in Iceland: Structure and conceptual models. 1. High-temperature areas Geothermics 24, 561-602.
Arnórsson, S. (1995b) Hydrothermal systems in Iceland: Structure and conceptual models. 2. Low-temperature areas. Geothermics 24, 603-629.
Kerr, T.M., 2007. Legal aspects of storing CO2: update and recommendations. OECD/IEA.
Hawkins, D.G., 2004. No exit: thinking about leakage from geologic carbon storage sites, Energy 29, 1571-1578.
Benson, S.M., Cole, D.R., 2008. CO2 sequestration in deep sedimentary formations. Elements 4, 325-331.
Mineral sequestration of carbon dioxide in basalt: A pre-injection overview of the CarbFix project; Gislason SR, Wolff-Boenisch D, Stefansson A, et al.; International Journal of Greenhouse Gas Control, vol. 4, Issue: 3, pp. 537-545, Pub. May 2010.
Sanopoulos, D. and Karabelas A. (1997). H2S abatement in geothermal plants: Evaluation of Process Alternatives. Energy Sources, 19, 63-77).
Hibara, Y., Araki, K., Tazaki, S. and Kondo, T. (1990) Recent technology of geothermal plants. Geothermal Resource Council Transactions 14, Part II: 1015-1024.
Oelkers, E., Gislason, S., 2001. The mechamism, rates and consequences of basaltic glass dissolution: I. an experimental study of the dissolution rates of basaltic glass as a function of aqueous al, si and oxalic acid concentrations at 25c and pH = 3 and 11. Geochim. Cosmochim. Acta 65, 3671-3681.
Global CCS Institute (2011) Economic Assessment of Carbon Capture and Storage Technologies 2011 update.
Rubin et al. (2015) Int. J. Greenh. Gas Control 40, 378-400.
Hu and Zhai (2017) Int. J. Greenh. Gas Control 65, 23-31.
Gilfillan et al. (2009) Nature 458, 614-618.
Sigfusson et al. (2015) Int. J. Greenh. Gas Control 37, 213-219.
Gunnarson et al (2018) Int. J. Greenh. Gas Control 79, 117-126.
PCT International Preliminary Report on Patentability issued on Sep. 11, 2021 in PCT/EP2020/064306 filed May 22, 2020.

* cited by examiner

METHOD OF ABATING CARBON DIOXIDE AND HYDROGEN SULFIDE

STATEMENT OF US GOVERNMENT SUPPORT

This invention was made with government support under DE-FE0004847 awarded by the United States Department of Energy. The government has certain rights in the invention.

CROSS REFERENCE TO RELATED APPLICATIONS

This patent application is a US National Stage Entry under 35 USC §371 of PCT/EP2020/064306, filed May 22, 2020, published as WO2020234464 A1 on Nov. 26, 2020 and claiming priority to EP 19175986.9 filed May 22, 2019, the contents of each of which are incorporated by reference.

FIELD OF THE INVENTION

The present invention relates to a method and a system for abating carbon dioxide ($CO_2$) and/or hydrogen sulfide ($H_2S$) by injecting these into and subsequently storing these in a geological reservoir.

BACKGROUND OF THE INVENTION

Carbon dioxide ($CO_2$) and hydrogen sulfide (H2S) are two gasses often released in large quantities during a wide range of industrial processes, e.g. combustion of fossil fuels. Both gasses present important challenges to the environment.

The reduction of industrial $CO_2$ emissions is one of the main challenges of this century (Ref. 1: Broecker and Kunzig). In general, $CO_2$ emission is relatively low from geothermal resources and these are classified as renewable energy sources. This is in contrast to regular power plants that are run on fossil fuels which buy and sell pollution permits (called "allowances").

Conventional geothermal plants utilize the heat of the Earth by making use of a hot mixture of steam and brine from a geothermal reservoir, characterized by a thermal anomaly, permeable rock, and fluid (Ref. 2: Barbier). The geothermal steam from these geothermal reservoirs naturally contains dissolved gases including both the greenhouse gas $CO_2$ and hydrogen sulfide ($H_2S$). The gases are a by-product of the geothermal energy production and are of magmatic origin. When conventional geothermal plants are operated the gases in the steam are vented into the atmosphere.

Hitherto geothermal power plants have been exempted from buying $CO_2$ allowances as their greenhouse gas emission is fairly low. However, as climate change policy becomes stricter this might change and it is predicted that the price of emitting $CO_2$ will rise.

The emission of hydrogen sulfide from geothermal power plants is another of the main environmental concerns of geothermal utilization. Hydrogen sulfide is a colorless, flammable and toxic gas with the characteristic odor of rotten eggs. Exposure to it can cause health problems depending on levels and duration of exposure. Low level, prolonged exposure can cause inflammation and irritation of the eyes whereas high levels of exposure for brief periods of time can cause dizziness, headache, nausea and even death if the concentration of $H_2S$ in atmosphere goes above 300 ppm.

Concentration of hydrogen sulfide in geothermal fluids is usually in the range of few ppb to several hundred ppm (Ref. 3+4: Arnórsson). During utilization of high temperature geothermal fluids, the hydrogen sulfide is concentrated in the steam phase and subsequently released into atmosphere after the steam condenses. Annually e.g. the Hellisheidi power plant, which is in Iceland, emits 9500 tons of hydrogen sulfide into atmosphere without any abatement system in place. The hydrogen sulfide is released on top of the cooling towers to lower the risk of high concentration of hydrogen sulfide close to the power station. The hydrogen sulfide is carried by wind away from the site of the power plant and can under some weather conditions cause foul smell in nearby communities.

To date $CO_2$ has been stored e.g. as a supercritical fluid in association with major gas and oil production facilities such as Sleipner in the North Sea, In Salah, Algeria, and Weyburn, Canada (Ref. 5: Kerr). Regardless, the abatement of $CO_2$ in geological structures remains an attractive, although still relatively unexplored, possibility for reducing the amount of $CO_2$ emitted to the atmosphere whether originating from geothermal energy production or from other sources (such as e.g. conventional power plants). The standard approach to geologic carbon storage/sequestration is to inject $CO_2$ as a bulk phase into geologic formations at depth >800 m. At this depth $CO_2$ is supercritical and buoyant with respect to the host rock fluids. As a result, buoyant $CO_2$ may migrate back to the shallow subsurface and surface (Ref. 6: Hawkins; Ref. 7: Benson).

Gislason et al. (Ref. 8) describes in a general way a method of capturing $CO_2$ that is transported in a 3 km pipeline to the pilot injection site as high pressurized gas. In the method envisaged, $CO_2$ is to be injected together with co-injected water, which will divert the injected $CO_2$ further down the well, which is according to the authors of the publication results in a single fluid phase entering the sequestration formation. Similarly Sigfusson et al. (Ref. 16) describes the injection of app. 175 t of $CO_2$ dissolved in 5000 t of water (at a depth of app 350 m below surface) into porous rocks located 400-800 m below the surface, and points to the fact that, even if large volumes of water are required for $CO_2$ storage via this method, the storage can be done at a lower distance from the surface than in case of supercritical $CO_2$, because the $CO_2$ is dissolved and, hence, no longer buoyant. Likewise Gunnarson et al. (Ref 17) describes the continuous injection of $CO_2$ and $H_2S$ (dissolved in water at a depth of app 750 m below surface) into basaltic rock located about 2000 m below surface at temperatures ranging from 200 to 260 C, and points to the fact that the large depth and high temperature permits injection of larger quantities of $CO_2$ and $H_2S$ than what can be obtained with injection into more shallow and colder rock formations.

The methods described in detail in these publications differ from those of the present invention. Thus, neither of these publications points to the importance of the relationship between the downward velocity of the water flow and the capability to efficiently ensure that the $CO_2$ and/or $H_2S$, released as bubbles of a given dimension at the merging point, are kept in solution at a given depth/pressure. The publications are, thus, silent as to the importance of transferring the water, which has been merged with the $CO_2$ and/or $H_2S$ rich gas streams, downwardly at a velocity, which is higher than the upward velocity of the bubbles of $CO_2$ and/or $H_2S$ gas dissolved in the water. In fact, quite to the contrary (Ref. 16) simply more generally points to the importance of dissolving the carbon-dioxide into the water during its injection, and mentions only typical volumetric flow rates and average residence times, just like it focuses on the importance of a fixed water to $CO_2$ mass ratio. This implies that it was apparently not fully understood by the authors of these publications at that point in time exactly which factors may in fact affect the usefulness of such methods. Similarly, neither of these publications points to the associated finding of the present invention that the water demand can thereby be diminished simply by increasing the downward flowing velocity of the water, e.g. by reducing the diameter of the pipe surrounding the merging point of the gas and water. This feature is of great economical importance to the feasibility of the methods of the present invention compared to those described in the prior art.

A review of the processes available for $H_2S$ abatement in the context of e.g. geothermal energy production (i.e. geothermal power plants) is provided by Sanopoulos and Karabelas (Ref. 9). Most known methods involve oxidation of $H_2S$ to elemental sulfur or sulfuric acid. The value of these products is low as there is either too little demand or excess supply. Disposal of these products is costly and can create environmental problems.

It has been speculated by Hibara et al. (Ref. 10) that $H_2S$ may be compressed and mixed with brine and reinjected into an auxiliary well. However, until now neither has such a method of abating hydrogen sulfide been described in detail, nor is it fully understood which factors may in fact affect the usefulness of such a method.

From the above it may be appreciated that there is a need for new, cost-effective and environmentally friendly abatement methods for abating $CO_2$ and/or $H_2S$, whether originating from geothermal energy production or from other sources (such as e.g. conventional power plants). The inventors of the present invention have found a new method to facilitate the safe and permanent geologic storage/sequestration of both $CO_2$ and $H_2S$ which enables that the water demand can be diminished considerably by increasing the downward flow velocity of the water, e.g. by simply reducing the diameter of the pipe surrounding a merging point of the $CO_2$ and/or $H_2S$ rich gas stream and the water. Thus, the safe long-term storage of $CO_2$ and/or $H_2S$ can be facilitated simply by controlling how much $CO_2$ and/or $H_2S$ gas is to be dissolved in the injected water at the given merging point and at a given downward velocity of the water.

SUMMARY OF THE INVENTION

As noted above, it would be advantageous to achieve an effective and environmentally friendly method for abating carbon dioxide emissions and/or hydrogen sulfide both of which are emitted from power plants, conventional as well as geothermal. In general, the present invention preferably seeks to mitigate, alleviate or eliminate one or more of the above mentioned disadvantages singly or in any combination.

To better address one or more of these concerns, in a first aspect of the invention a method is provided for storing carbon dioxide ($CO_2$) and/or hydrogen sulfide (H2S) in a geological reservoir, comprising:

pumping (or otherwise transferring) water from a water source to an injection well, dissolving $CO_2$ and/or $H_2S$ gas in the water by merging a $CO_2$ and/or $H_2S$ rich gas stream with the water under conditions where the hydraulic pressure of the water is lower than the partial pressure of the $CO_2$ and/or $H_2S$ in the $CO_2$ and/or $H_2S$ rich gas stream, ensuring that the dissolved $CO_2$ and/or $H_2S$ is kept in solution in the water by transferring the water comprising the dissolved $CO_2$ and/or $H_2S$ downwardly at a velocity, which is higher than the upward velocity of the bubbles of $CO_2$ and/or $H_2S$ gas in the water, keeping the resulting pH value of said pressurized water stream containing said dissolved $CO_2$ and or $H_2S$ between about 2 and 4, preferably between about 2.5 and 3.5, more preferably about 3.2, and injecting the water comprising the dissolved $CO_2$ and/or $H_2S$ into the geological reservoir.

In the context of the present invention the term pumping is to be understood as any means of transferring a liquid, e.g. water, from one location to another.

In the context of the present invention, the term water source or water is to be understood as any kind of water, such as e.g. groundwater, ocean/sea-water, spring water, geothermal condensate or brine, or surface waters from rivers, streams or lakes.

In the context of the present invention the term injection well is to be understood as any kind of structure providing for a possibility of placing fluids or gases either deep underground or just into the ground in a downwardly direction, such as e.g. a device that places fluid into reactive rock formations, such as basalt or basaltic rock, and porous rock formations, such as sandstone or limestone, or into or below the shallow soil layer.

In the context of the present invention, a $CO_2$ and/or $H_2S$ rich gas stream is to be understood as any gas stream of which the relative content of $CO_2$ and/or $H_2S$ is higher than the relative content of $CO_2$ and/or $H_2S$ of atmospheric air.

In the context of the present invention the term hydraulic pressure is to be understood as the pressure of a hydraulic fluid, which it exerts in all direction of a vessel, well, hose or anything in which it is present. A hydraulic pressure may give rise to flow in a hydraulic system as fluid flows from high pressure to low pressure. Pressure is measured in the SI unit pascal (Pa), i.e. one newton per square meter (1 $N/m^2$) or 1 $kg/(m \cdot s^2)$, or 1 $J/m^3$. Other units of pressure commonly used are pound per square inch or, more accurately, pound-force per square inch (abbreviation: psi) and bar. In SI units, 1 psi is approximately equal to 6895 Pa and 1 bar is equal to 100,000 Pa.

In the context of the present invention, the term partial pressure or just pressure of a gas (of the $CO_2$ and/or $H_2S$) is to be understood as the notional pressure of said given gas in a mixture of gases, if this given gas in itself occupied the entire volume of the original mixture at the same temperature. The total pressure of an ideal gas mixture is the sum of the partial pressures of the individual constituent gases in the mixture.

In the context of the present invention, the term velocity is to be understood as a vector quantity that refers to the rate at which an object changes its position in a certain direction. Thus, velocity equals distance/time and the SI unit is m/s. Water moving in a given direction at a given velocity will do so with a certain flow rate, which may be provided as either a volumetric flow rate or a mass flow rate. Volumetric flow rate is the volume of fluid, which passes a given point per unit time and is usually represented by the symbol Q (sometimes V). The SI unit for volumetric flow rate is m3/s. Thus, volume flow rate equals volume/time. Mass flow rate on the other hand is the mass of fluid, which passes a given point per unit time (kg/s).

In the context of the present invention injecting or inject is to be understood as introducing something forcefully into something else, i.e. to force a fluid into an underground structure.

In the context of the present invention, the term geological reservoir is to be understood as fractures in an underground structure, e.g. basaltic rock, that expands in other directions than upwardly and downwardly, which structure provides a flow path for the water injected into an injection well according to the present invention and may include what is referred to as a geothermal reservoir. In the present context the term geothermal reservoir is to be understood as fractures in hot rock that expand in other directions than upwardly and downwardly and provide a flowing path for the injected water from a well.

The fact that the method and the systems of the present invention ensures that the pressure of the dissolved $CO_2$ and/or $H_2S$ is less than the hydraulic pressure of the water (and is thereby kept in solution) when transferring the water downwardly, ensures that the $CO_2$ and/or $H_2S$ stays dissolved in the water, which improves considerably security due to decreased leakage risks. Also, this enables that the water demand of methods according to the present invention can be diminished considerably by increasing the downward flow velocity of the water, e.g. by simply reducing the diameter of the pipe surrounding a merging point of the $CO_2$ and/or $H_2S$ rich gas stream and the water. Injection of $CO_2$ promotes the carbonation of the host rock and thus facilitates the safe long-term storage of $CO_2$ in the subsurface. Accordingly, a method is provided where water-rock reactions already taking place in natural reactive rock, e.g. basaltic rock, reservoirs in geothermal systems are utilized by means of injecting $CO_2$ and/or $H_2S$ back into the reservoir geothermal system. The environmental impact caused by $CO_2$ and/or $H_2S$ gas emission from e.g. geothermal plants will therefore be lowered. Also, the safe long-term storage of $CO_2$ and/or $H_2S$ can be facilitated simply by controlling how much $CO_2$ and/or $H_2S$ gas is to be dissolved in the injected water at the given merging point and at the given downward velocity of the water.

Also, the abatement method of the present invention is very economical and environmentally friendly as there are no byproducts that need to be disposed of Returning the $CO_2$ and/or $H_2S$ back to where they came from has to be considered as an ideal method for reducing gas emission from e.g. geothermal power plants.

The fact that the method and the systems of the present invention ensures that the gas pressure (i.e. the partial pressure) of the dissolved $CO_2$ and/or $H_2S$ is less than the hydraulic pressure of the water (and is thereby kept in solution) when transferring the water downwardly, ensures that the gasses stays dissolved in the water and do not degas from the water. Thus, the method of the present invention minimizes the risk of gas bubbles rising out of the water, which would otherwise mean that the $CO_2$ and/or $H_2S$ would not be effectively transferred into the geological reservoir where the gasses are to absorbed and/or mineralized.

At the same time the low pH of the water promotes the dissolution of minerals in the geological reservoir thereby providing the cations necessary for carbon and sulphur mineralization and abatement.

Since the pressure of the $CO_2$ and/or $H_2S$ prior to injecting them into the water is larger than the hydraulic pressure of the water, gas bubbles will be present in the water at the merging point (i.e. the point of gas injection), but since the gas bubbles are transferred downwardly at a critical water velocity, it is ensured that the gas streams will dissolve into the water and stay dissolved, i.e. will stay in solution.

In one embodiment, said step of dissolving the gas in the water comprises conducting the $CO_2$ and/or $H_2S$ gas via an injection pipe having an open end extending down into said injection well at a depth that is selected such that the hydraulic pressure of the water in said injection well at said open end of the injection pipe is less than the $CO_2$ and/or $H_2S$ gas pressure in the injection pipe, while at the same time ensuring that the water is transferred downwardly at a velocity relative to the point where the gasses are injected into the injection well, which ensures that for a given subpart of the water stream the hydraulic pressure of the water is larger than the pressure of the dissolved $CO_2$ and/or $H_2S$ relatively shortly after the gasses have been injected into the water. Thus, the hydraulic pressure that is needed both to dissolve the $CO_2$ and/or $H_2S$ gas in the water and to keep the $CO_2$ and/or $H_2S$ gas in solution in the water is obtained by transferring the water and the gases to the appropriate depth(s) and therefore no external energy is needed at neither the merging point nor below to obtain or keep the hydraulic pressure needed. Furthermore, a method according to the present invention ensures that when the $CO_2$ and/or $H_2S$ is injected into the injection well (which is possible because the hydraulic pressure in the injection pipe is larger than the hydraulic pressure in the injection well) at the open end it will not start to "effervesce" after being injected, but instead be kept in a dissolved state, i.e. in solution, for the necessary time frame for the $CO_2$ and/or $H_2S$ mineralizing water rock reactions to take place. This is similar to avoiding the scenario that would otherwise occur when a bottle of soda is opened, and the bubbling of carbon dioxide starts and thus the releasing of the carbon dioxide from the bottle into the atmosphere. Thus, if the bottle is opened under a surrounding pressure equal to or higher than that in the bottle such a carbon dioxide bubbling would not occur. The low pH of the water, in a method according to a method according to the present invention, furthermore, due to the presence of dissolved $CO_2$ and/or $H_2S$ therein promotes the dissolution of minerals in the geological reservoir thereby providing the cations necessary for carbon and sulphur mineralization and abatement.

In one embodiment, the step of dissolving $CO_2$ and/or $H_2S$ gas in the water comprises conducting the $CO_2$ and/or $H_2S$ gas via an injection pipe having an open end extending down into said injection well where the injection pipe is surrounded by an outer pipe having an open end positioned at a larger depth than said open end of the injection pipe, said pumping of water being performed into the space between the outer pipe and the injection pipe, said depth at the open of the injection pipe within said outer pipe being selected such that the hydraulic pressure of the water within the outer pipe at said open end of the injection pipe is less than the $CO_2$ and/or $H_2S$ gas pressure in the injection pipe, while at the same time ensuring that the water is transferred downwardly at a velocity relative to the point where the gasses are injected into the injection well, which ensures that for a given subpart of the water stream the hydraulic pressure of the water is larger than the sum of the partial pressure of the dissolved $CO_2$ and/or $H_2S$ relatively shortly after the gasses have been injected into the water.

In one embodiment, the pumping rate of the water and the diameter of the pipe is selected such that the drag force of the downward flowing water into the injection well is larger than the buoyant force on the $CO_2$ and/or $H_2S$. It is thus ensured that a constant downwardly flowing water stream is provided ensuring that the dissolved $CO_2$ and/or $H_2S$ will move downward and towards the storage reservoir. Methods or systems working with relatively small bubbles, e.g. below 6 mm in diameter, will according to the present invention need a minimum water velocity of between 0.4 m/s and 1.4 m/s depending on dynamic forces in the system.

In one embodiment, the pressure of the $CO_2$ gas at the open end of the injection pipe (i.e. where the hydraulic pressure of the water in said injection well is less than the $CO_2$ gas pressure in the injection pipe) is between 20-35 bar. At this pressure, the temperature of the water may be, but is not limited to, between 20-40° C. resulting in a single fluid phase entering the storage formation, which e.g. consists of relatively fresh basaltic lavas.

In one embodiment, the depth at said open end of the outer pipe is selected such that pH value of the injection water containing dissolved $CO_2$ is between 2 and 4, preferably between 2.5 and 3.5, more preferably around 3.2. It is at this depth that the dissolved $CO_2$ and/or $H_2S$ leave the outer pipe and the sequestration of the $CO_2$ and $H_2S$ in rocks starts, i.e. the storing of the carbon dioxide $CO_2$ and/or hydrogen sulphide $H_2S$ in the geological reservoir. The lower the pH value the faster will the dissolution rate be of the rock meaning that with such a low pH value the sequestration of the carbon dioxide $CO_2$ and/or hydrogen sulphide $H_2S$ in the storage reservoir will be significantly enhanced.

In one embodiment, said step of dissolving the $CO_2$ and/or $H_2S$ gas in said water further includes mixing, e.g. by means of a sparger and/or mixer, the dissolved $CO_2$ and/or $H_2S$ with the water at or below the merging point so as to obtain a uniform mixing of the $CO_2$ and/or $H_2S$ gas in the water, breaking up larger bubbles and dissolving any remaining $CO_2$ and/or $H_2S$ gas bubbles in the water. Accordingly, more turbulence will be created in the mix of $CO_2$ and/or $H_2S$ gas and the pressurized water, which will enhance the dissolution of $CO_2$ and/or $H_2S$ gas at and/or below the merging point further. Also, large $CO_2$ and/or $H_2S$ gas bubbles will be split into smaller gas bubbles which will also enhance the dissolution of the $CO_2$ and/or $H_2S$.

In one embodiment, said source of water is selected from one or more of the following: surface waters, groundwater or seawater.

In one embodiment, said step of dissolving the $CO_2$ gas with said water further includes maximizing the interfacial area between the $CO_2$ and/or $H_2S$ gas and the water. Accordingly, the $CO_2$ and/or $H_2S$ gas bubbles will be equally distributed within the pressurized water and further the average diameter of the bubbles will be reduced causing said maximization of the interfacial area between the $CO_2$ and/or $H_2S$ gas and the water, where both these factors enhance the dissolution rate of $CO_2$ and/or $H_2S$ in the pressurized water significantly.

In one embodiment, said step of dissolving the $CO_2$ and/or $H_2S$ gas in said water further includes mixing the dissolved $CO_2$ and/or $H_2S$ with the water so as to obtain a uniform mixing of the $CO_2$ and/or $H_2S$ gas in the water and dissolving any remaining $CO_2$ and/or $H_2S$ gas bubbles in the water. Accordingly, more turbulence will be created in the mix of $CO_2$ and/or $H_2S$ gas and the pressurized water, which will enhance the dissolution of $CO_2$ and/or $H_2S$ gas further. Also, large $CO_2$ and/or $H_2S$ gas bubbles will be split into smaller gas bubbles which will also enhance the dissolution rate of the $CO_2$ and/or $H_2S$.

In one embodiment, said step of dissolving $CO_2$ and/or $H_2S$ gas in the water comprises conducting the $CO_2$ and/or $H_2S$ gas via an injection pipe having an open end extending down into said injection well at a depth that is selected such that the hydraulic pressure of the water in said injection well at said open end of the injection pipe is less than the $CO_2$ and/or $H_2S$ gas pressure in the injection pipe, while at the same time ensuring that the water is transferred downwardly at a velocity relative to the point where the gasses are injected into the injection well, which ensures that for a given subpart of the water stream the hydraulic pressure of the water is larger than the partial pressure of the dissolved $CO_2$ and/or $H_2S$ relatively shortly after the gasses have been injected into the water. The hydraulic pressure is slightly less than the gas pressure at the depth of the merging point, firstly to ensure that the $CO_2$ and/or $H_2S$ gas can enter the water in the injection well at the depth of the merging point and secondly, that, after having been dissolved in the water and moved downwardly at a given downwardly velocity, the hydraulic pressure of the water at that somewhat larger depth is larger than the pressure of the $CO_2$ and/or $H_2S$. Accordingly, by selecting the depth of the merging point in the injection well and the downwardly velocity of the water it is ensured that the $CO_2$ and/or $H_2S$ gas bubbles coming from the open end of the injection pipe will within very short timeframe be dissolved in the water and the $CO_2$ and/or $H_2S$ will stay dissolved in the water prior to the mineralization process within the geological reservoir. At the same time the low pH of the water, due to the addition of the $CO_2$ and/or $H_2S$ gas promotes the dissolution of minerals in the geological reservoir thereby providing the cations necessary for carbon and sulphur mineralization and abatement.

In one embodiment, the method further comprises the step of estimating the mineralization capacity of the $CO_2$ and/or $H_2S$ where the step of estimating this comprises:

dissolving, in addition to said $CO_2$ and/or $H_2S$, a tracer substance in the water, the concentration of the dissolved $CO_2$ and/or $H_2S$ and the dissolved tracer substance being performed in a controllable way such that the initial molar ratio between $CO_2$ and/or $H_2S$ and the tracer substance is pre-determined, monitoring, in response to injecting said $CO_2$ and/or $H_2S$ and the dissolved tracer substance, the molar ratio between the $CO_2$ and/or $H_2S$ and the tracer substance in a monitoring well, the monitoring well being a well interlinked to said injection well via a flow path such that at least a part of said injected water mixed with said dissolved $CO_2$ and/or $H_2S$ and said tracer substance flows to said monitoring well via said flow path, the monitoring including measuring the concentration of the $CO_2$ and/or $H_2S$ and the tracer substance and based thereon the molar ratio between the $CO_2$ and/or $H_2S$ and the tracer substance at said monitoring well, and determining an abatement indicator indicating the amount of $CO_2$ and/or $H_2S$ abatement achieved via water-rock reactions, said determination being based on comparing the molar ratio between the $CO_2$ and/or $H_2S$ and the tracer substance in the monitoring well with the corresponding molar ratio in the injection well at the merging point.

Based on such a measurement it is possible to determine whether the geological reservoir in question possesses the ability to store in mineralogical form the $CO_2$ and/or $H_2S$, which is injected via the injection well.

As regards $CO_2$ said tracer substance can be, but is not limited to, SF5CF3 tracer, $SF_6$ or Rhodamine tracer (all being conservative tracers), or C-14 tracer to trace only the carbon. One or more of these tracers may be used at the same time.

Similarly it is possible to determine whether geological systems in e.g. Iceland, possess the ability to mineralize $H_2S$ through water-rock reactions by use of tracer substance such as, but not limited to, iodine ions by dissolving KI in the pressurized water.

In one embodiment, the method further comprises carrying out a correction of said abatement indicator taking into account oxidation of $H_2S$ with other sulfide species. This will thus make the estimation of the abatement capacity more precise. Correction may be made by analyzing other types of sulfur in the geothermal water from the injection well, compare them to values obtained prior to injection of the $H_2S$ and adding the excess sulfur species (e.g. $SO_4^{2-}$ and $S_2O_3^-$) formed by oxidation of $H_2S$ to the $H_2S$ value before calculating the $H_2S$ abatement index.

In one embodiment, the interlink between said injection well and monitoring well is a fracture in the geological reservoir.

In one embodiment, said method further comprises providing a constriction at the open end of said injection pipe so as to maintain high hydraulic pressure in the injection pipe so as to further secure that the $CO_2$ or the $H_2S$ gas will remain dissolved in the injected water.

In a second aspect of the invention a system is provided adapted for abating $CO_2$ and/or $H_2S$, comprising:
means for pumping water from a water source into an injection well,
means for pumping $CO_2$ and/or $H_2S$ gas into an injection well
means for dissolving the $CO_2$ and/or $H_2S$ gas in the water at a depth, $h1 \geq 0$, in the injection well where the hydraulic pressure of the water is lower than the pressure of the $CO_2$ and/or $H_2S$,
means for transferring said water stream from said depth $h1 \geq 0$ to a greater depth $h1+h2$, where $h1+h2 > h1$, at a downward flow velocity, which is higher than the upward flow velocity of the bubbles of said $CO_2$ and/or $H_2S$ gas, resulting from the buoyant force on said bubbles of $CO_2$ and/or $H_2S$ gas in said water,
means for keeping the resulting pH value of said pressurized water stream containing said dissolved $CO_2$ and or $H_2S$ between about 2 and 4, preferably between about 2.5 and 3.5, more preferably about 3.2, and
means for injecting the water comprising said dissolved $CO_2$ and/or $H_2S$ into a geological reservoir.

In one embodiment, said means for dissolving $CO_2$ and/or $H_2S$ gas in the water comprises an injection pipe for conducting high pressurized $CO_2$ and/or $H_2S$ gas into the injection well, the injection pipe having an open end extending down into said injection well at a depth $h1 \geq 0$ that is selected such that the hydraulic pressure of the water in said injection well at said open end of the injection pipe is less than the $CO_2$ and/or $H_2S$ gas pressure in the injection pipe, and pump means enabling a downward flow velocity of the water higher than the upward flow velocity of bubbles of said $CO_2$ and/or $H_2S$ gas at depths larger than h1, thereby ensuring that the water is transferred to depths larger than h1 without the $CO_2$ and/or $H_2S$ escaping the water.

In one embodiment, the system further comprises an outer pipe surrounding said injection pipe having an open end extending down into said injection well at a further depth $h1+h2$, said means for pumping being a water pump that pumps the water into the space between the outer pipe and the injection pipe, said means for injecting the dissolved $CO_2$ and/or $H_2S$ into the geological reservoir being the downward flow velocity and resulting flow rate of water formed through the pumping of the water into said space between the outer pipe and the injection pipe. In a situation wherein the gas is restricted to $CO_2$ the $h1+h2$ may be selected such that the pH value of the injection water containing dissolved $CO_2$ is below a pre-defined pH limit.

In one embodiment, said means for dissolving $CO_2$ and/or $H_2S$ with the water further comprises:
a sparger mounted at said open end of the gas injection pipe adapted to maximize the interfacial area between the $CO_2$ and/or $H_2S$ gas and the water, or
a mixer mounted within said outer pipe between said open end of the injection pipe and said open end of the outer pipe adapted for mixing the $CO_2$ and/or $H_2S$ with the water so as to obtain a uniform mixing of the $CO_2$ and/or $H_2S$ gas in the water and dissolving any remaining bubbles of $CO_2$ and/or $H_2S$ gas in the water, or
a sparger mounted at said open end of the injection pipe adapted to maximize the interfacial area between the $CO_2$ and/or $H_2S$ gas and the water and a mixer mounted within said outer pipe between said sparger and said open end of the outer pipe adapted for mixing the $CO_2$ and/or $H_2S$ with the water so as to obtain a uniform mixing of the $CO_2$ and/or $H_2S$ gas in the water and dissolving any remaining bubbles of $CO_2$ and/or $H_2S$ in the water.

Accordingly, a practical and cost-effective system for in situ mineral carbonation in reactive rocks, e.g. basaltic rocks, is provided that injects water with high enough concentrations of dissolved $CO_2$ and/or $H_2S$ concentration to favor reaction with the reactive rock, e.g. basaltic rock. Similarly, the low pH of the water promotes the dissolution of minerals in the geological reservoir thereby providing the cations necessary for carbon and sulphur mineralization and abatement.

In a method according to the present invention, once dissolved, $CO_2$ and/or $H_2S$ is no longer buoyant, which dramatically improves security due to decreased leakage risks. Injection of dissolved $CO_2$ and/or $H_2S$ also promotes the carbonation of the host rock and thus facilitates the safe long-term storage of $CO_2$ and/or $H_2S$ in the subsurface.

It should be noted that the term water can according to the present invention mean fresh water, water from geothermal wells, brine, sea water and the like. Said water source may, thus, be any type of water. Likewise, the $CO_2$ and/or $H_2S$ gas may originate from any source, such as conventional power plants, geothermal power plants, industrial production, gas separation stations or the like.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Hereinafter a number of embodiments of the invention are described, by way of example only, with reference to the drawings, in which.

DESCRIPTION OF EMBODIMENTS

Figure 1:
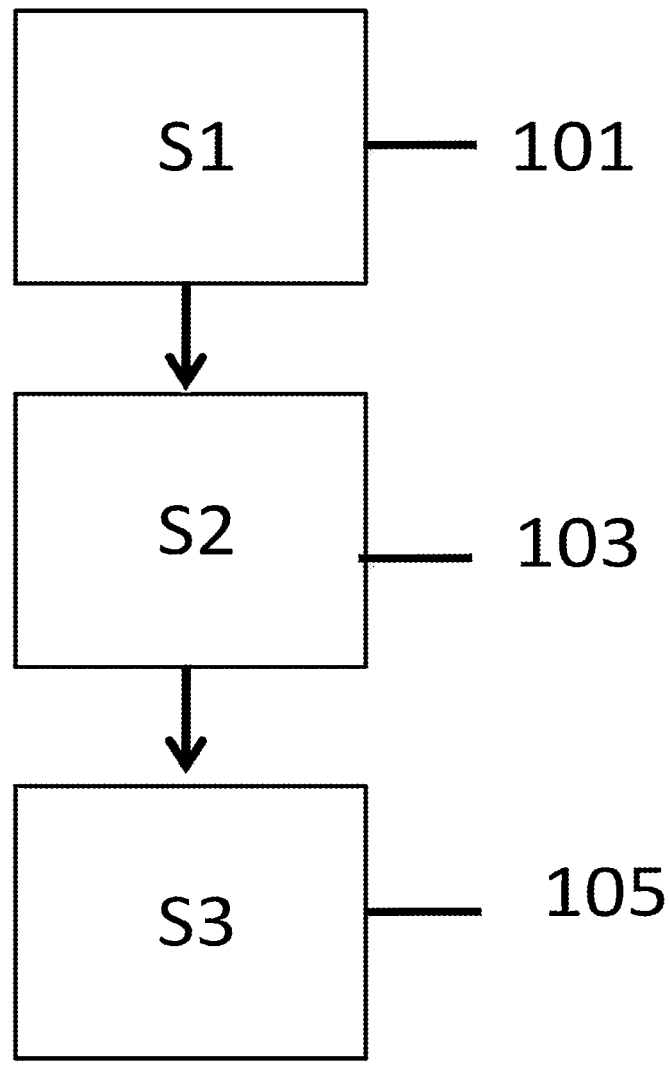
FIG. 1 shows a flowchart of a method according to the present invention of abating $CO_2$ and/or $H_2S$ in a geological reservoir.

FIG. 1 shows a flowchart of a method according to the present invention of abating $CO_2$ and/or $H_2S$ in a geological reservoir. The term geological reservoir may be understood as fractures in hot rock that expand in other directions than upwardly and downwardly and provide a flowing path for the injected water from the well.

In a first step (S1) 101, water is pumped from water source to an injection well. The water source may be, but is not limited to, geothermal water, brine and the like, or it can be fresh water and sea water. For simplicity, hereafter the term "water" will be used. Also, the temperature of the water can vary from being only a few degrees Celsius up to several hundred degrees.

In a second step (S2) 103, $CO_2$ and/or $H_2S$ gas is merged with the water at a merging point where the hydraulic pressure of the water is lower than the pressure of $CO_2$ and/or $H_2S$, while at the same time ensuring that the water is transferred downwardly at a velocity relative to the point where the gasses are injected into the injection well, which ensures that for a given subpart of the water stream the hydraulic pressure of the water is larger than the partial pressure of the $CO_2$ and/or $H_2S$ relatively shortly after the gasses have been injected into the water.

In step (S3) 105, the water with the dissolved $CO_2$ and/or $H_2S$ is injected into the geological reservoir.

In one embodiment, step (S2) 103 comprises conducting the $CO_2$ and/or $H_2S$ gas via an injection pipe having an open end extending down into said injection well at a depth, $h1 \geq 0$, that is selected such that the hydraulic pressure of the water in the injection well at the open end of the injection pipe is less than the $CO_2$ and/or $H_2S$ gas pressure in the injection pipe. This is simply to enable the $CO_2$ and/or $H_2S$ gas to flow into the water at the depth $h1 \geq 0$. At the same time a downward flow velocity of the water higher than the upward flow velocity of the bubbles of said $CO_2$ and/or $H_2S$ gas at depths larger than h1 is provided, thereby ensuring that the water is transferred to depths larger than h1 without the $CO_2$ and/or $H_2S$ escaping the water.

In a preferred embodiment the pressure of the $CO_2$ gas at the open end of the injection pipe is between 20-35 bar. This large pressure ensures that the pH value of water containing the dissolved $CO_2$ is relatively low which will enhance the $CO_2$ water rock reactions in the geological reservoir.

One of the important aspects of the present invention is the dissolution of $CO_2$ (and/or $H_2S$) in water before it is dispersed as a single-phase fluid into the pore space of reactive rock formations. The $CO_2$ dissolves to form carbonic acid ($H_2CO_3$), which can dissociate into bicarbonate ($HCO_3^-$) and carbonate ($CO_3^{2-}$) according to:

$$CO_{2(g)} = CO_{2(aq)} \quad (1a)$$

$$CO_{2(aq)} + H_2O = H_2CO_{3(aq)} \quad (1b)$$

$$H_2CO_{3\ (aq)} = HCO_3^- + H^+ \quad (1c)$$

$$HCO_3^- = CO_3^{2-} + H^+ \quad (1d)$$

For example, plagioclase (($Ca, Na)Al_{1.70}Si_{2.30}O_8$), olivine (($Mg, Fe)_2SiO_4$) and pyroxene (($Ca, Mg, Fe)_2SiO_3$) are the most abundant primary minerals in basaltic rocks but basaltic glasses are also common. When the minerals and glasses come in contact with the injected acidic fluid, dissolution reactions occur leaching cations such as $Ca^{2+}$, $Mg^{2+}$ and $Fe^{2+}$ from the rock matrix. Reactions 2-5 here below show the dissolution of plagioclase, olivine, pyroxene, and basaltic glass, respectively. Composition of basaltic glass in reaction 5 is that of Stapafell glass as reported in the scientific literature by Oelkers and Gislason (Ref. 11).

$$(Ca,Na)Al_{1.70}Si_{2.30}O_{8(s)} + 6.8H^+ = (Ca^{2+},Na^+) + 1.70Al^{3+} + 2.3SiO_{2(aq)} + 3.4H_2O_{(l)} \quad (2)$$

$$(Mg,Fe)_2SiO_{4(s)} + 4H^+ = 2(Mg,Fe)^{2+} + SiO_{2(aq)} + 2H_2O_{(l)} \quad (3)$$

$$(Ca,Mg,Fe)_2SiO_3 + 2H^+ = 2(Ca,Mg,Fe)^{2+} + SiO_{2(aq)} + H_2O_{(l)} \quad (4)$$

$$SiAl_{0.36}Fe_{0.19}Mg_{0.28}Ca_{0.26}Na_{0.08}K_{0.008}O_{3.31} + 2.58H^+ = SiO_{2(aq)} + 0.36Al^{3+} + 0.19Fe^{2+} + 0.28Mg^{2+} + 0.26Ca^{2+} + 0.08Na^+ + 0.008K^+ + 1.30H_2O_{(l)} \quad (5)$$

As dissolution reactions 2-5 proceed in the subsurface after $CO_2$ and/or $H_2S$ injection, protons ($H^+$) are consumed and pH of formation fluids increases.

Figure 2:
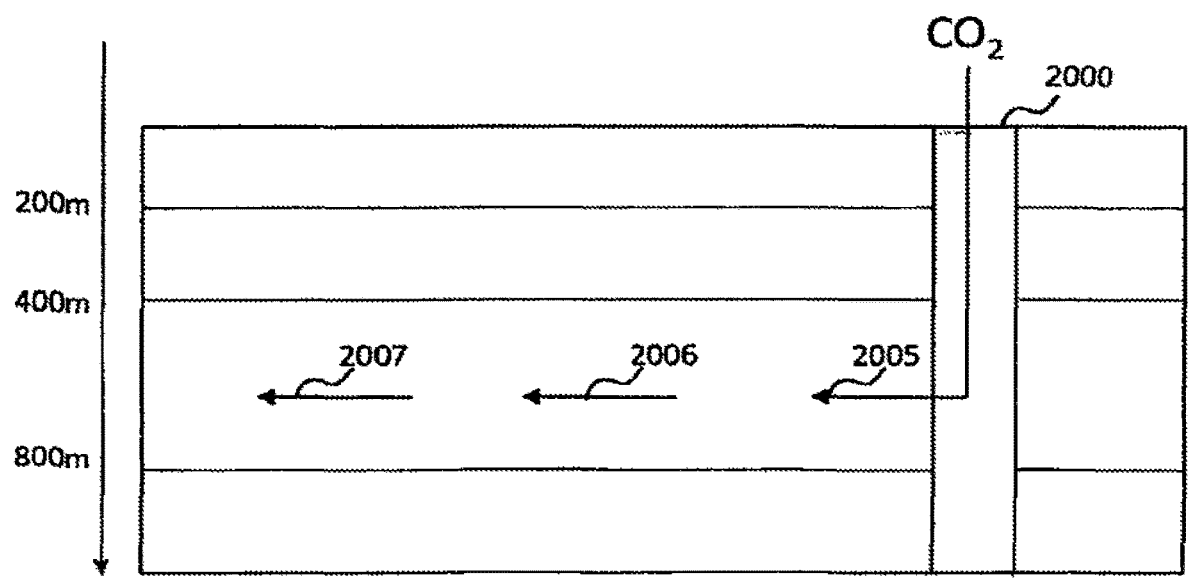
FIG. 2 shows a schematic representation of host rock and formation fluid interaction during in situ $CO_2$ mineral sequestration.

Concentration of leached cations also builds up as the water flows away from the injection well, as displayed in FIG. 2, showing a schematic representation of host rock and formation fluid interaction during in situ $CO_2$ mineral sequestration after $CO_2$ is injected into an injection well 2000. The left side in FIG. 2 shows a depth scale extending below 800 m. The arrows 2005-2007 indicate the direction of regional groundwater flow and also different distances from the injection well 2000, where at arrow 2005 the water next to the injection well 2000 may be weakly acidic, where a single phase fluid enters formations and leaches cations out of the rock matrix. At more distance from the injection well 2000, at arrow 2006 the concentration of the ions increases as dissolution of rock proceeds and the pH of water increases. At further distance from the injection well 2000, at arrow 2007 mineral supersaturation and precipitation occurs where clays and zeolites compete with carbonates for dissolved cations.

At certain concentrations, the water becomes supersaturated with respect to secondary minerals like carbonates, which begin to precipitate according to reaction 6:

$$(Ca,Mg,Fe)^{2+} + CO_3^{2-} = (Ca,Mg,Fe)CO_{3(s)} \quad (6)$$

Calcite ($CaCO_3$), dolomite ($CaMg(CO_3)_2$), magnesite ($MgCO_3$) and siderite ($FeCO_3$) are among proposed carbonate forming minerals. It is difficult to predict beforehand which of these carbonates will actually precipitate in the subsurface during $CO_2$ injection as well as to what extent they will form. Other minerals, such as clays, hydroxides and zeolites, are likely to form as well and compete with reaction 6 for leached cations.

Figure 3:
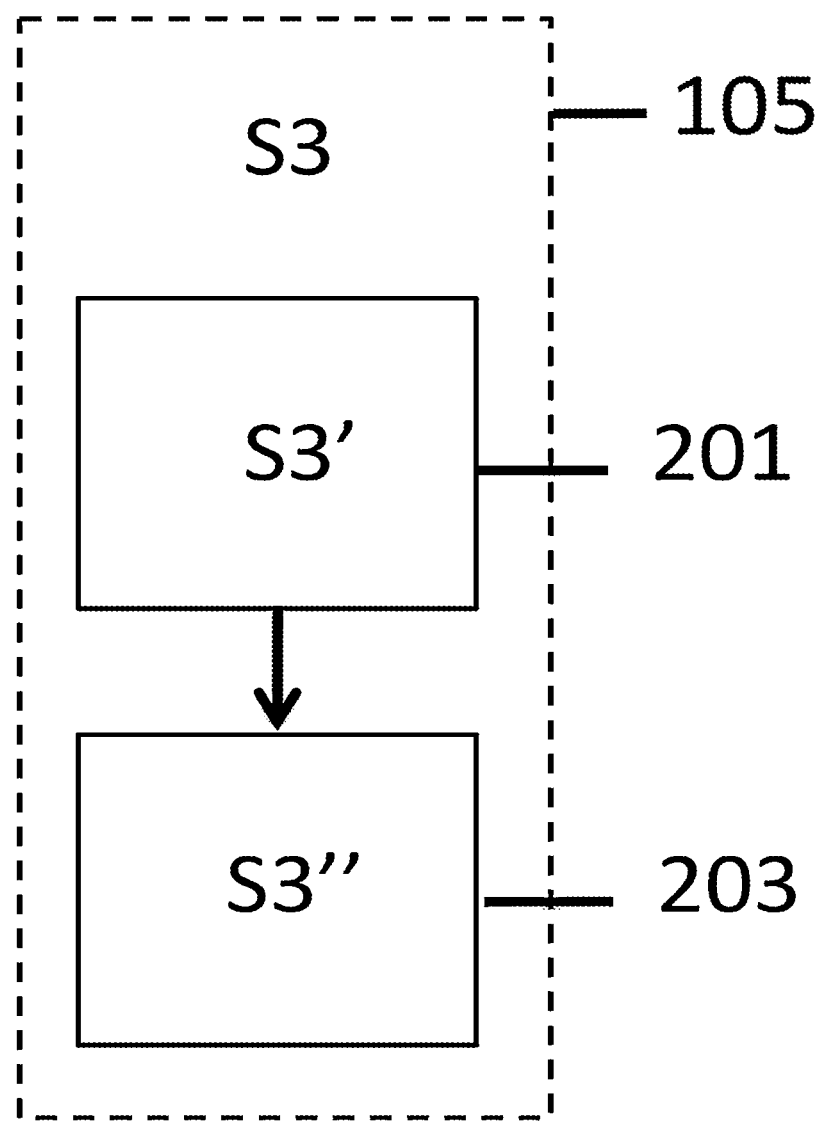
FIG. 3 shows a flowchart of an embodiment of a method according to the present invention indicating in more details how the dissolved $CO_2$ and/or $H_2S$ is injected into the geological reservoir.

FIG. 3 shows a flowchart of an embodiment of a method according to the present invention indicating in more details how said step (S3) 105 is performed.

In step (S3') 201, the hydraulic pressure of the water pumped from said water source is increased so as to form pressurized water. This may e.g. be done by pumping the water from the water source to the injection well via a pipeline, where the pressure in the pipeline is increased e.g. via the appropriate equipment such as a water pump such that the pressure can be controlled and adjusted to the pressure of the $CO_2$ and/or $H_2S$ gas to be dissolved.

In step (S3") 203, the $CO_2$ and/or $H_2S$ gas is dissolved with the pressurized water, where the hydraulic pressure of the water is selected such that during the gas dissolution the hydraulic pressure of the water is less than the pressure of the $CO_2$ and/or $H_2S$ gas. The pressure of the water is in one embodiment around 6 bars or somewhat lower than the pressure of the $CO_2$ and/or $H_2S$ gas. In this embodiment, said step (S3) 105 of injecting the dissolved $H_2S$ into the geological reservoir is performed via an injection pipe having an open end extending down into the injection well at a depth, $h1 \geq 0$, that is below the surface level of the water in the injection well. This depth is preferably selected such that the hydraulic pressure of the water in the injection well where the open end of the injection pipe is located in the well is less than the hydraulic pressure of the water in the injection pipe, but at a somewhat larger depth, h2, reached when the water flows downward, is larger than the pressure of the dissolved $CO_2$ and/or $H_2S$. The reason of doing so is to ensure that when the water with the dissolved $CO_2$ and/or $H_2S$ comes out from the open end of the injection pipe, the surrounding pressure will be larger than the pressure of the dissolved $CO_2$ and/or $H_2S$. By doing so the dissolved $CO_2$ and/or $H_2S$ will stay in a dissolved state until the $CO_2$ and/or $H_2S$ mineralizing water rock reactions start. At the same time the low pH of the water containing the dissolved $CO_2$ and/or $H_2S$ promotes the dissolution of minerals in the geological reservoir thereby providing the cations necessary for carbon and sulphur mineralization and abatement. This gas dissolving process can be facilitated by using the appropriate equipment for maximizing the interfacial area between the $H_2S$ gas and the water and/or mixing the dissolved $H_2S$ with the water so as to obtain a uniform mixing of the $H_2S$ in the water and dissolving any remaining $H_2S$ gas bubbles in the water.

In one embodiment, said step (S3) 105 of dissolving $CO_2$ and/or $H_2S$ gas in the water comprises conducting the $CO_2$ and/or $H_2S$ gas via an injection pipe having an open end extending down into said injection well at a depth, $h1 \geq 0$, that is selected such that the hydraulic pressure of the water in the injection well at the open end of the injection pipe is less than the $CO_2$ and/or $H_2S$ gas pressure in the injection pipe. Preferably, the hydraulic pressure is slightly less that the $CO_2$ and/or $H_2S$ gas pressure in the pipeline at this open end, firstly to ensure that the $CO_2$ and/or $H_2S$ gas can enter the water in the injection well, and secondly, that after having entered the water at depth $h1 \geq 0$ and having travelled some distance downwardly with the water stream, that the hydraulic pressure at that larger depth, $h1+h2$ (i.e. after the $CO_2$ and/or $H_2S$ has travelled the distance h2 downwardly), is larger than the pressure of the dissolved $CO_2$ and/or $H_2S$ in the water. This injection pipe may e.g. be a pipe that extends from a gas separation station where $CO_2$ and/or $H_2S$ gas is separated from geothermal gas and subsequently conducted to the injection well via a pipeline.

Figure 4:
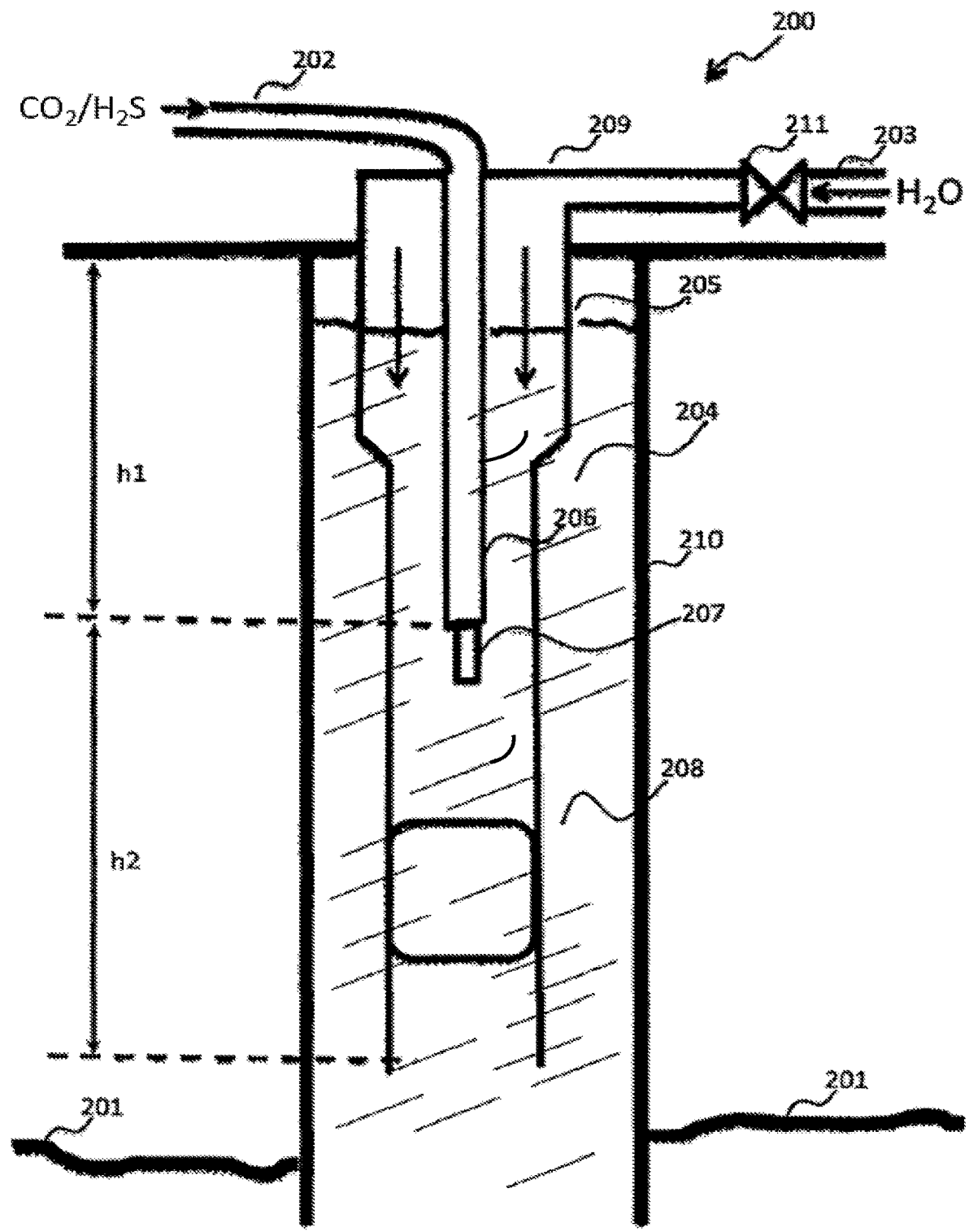
FIG. 4 shows a system according to the present invention for storing carbon dioxide ($CO_2$) in a geological reservoir.

FIG. 4 depicts graphically an embodiment of a system 200 according to the present invention for storing carbon dioxide $CO_2$ in a geological reservoir 201. The system comprises a $CO_2$ gas pipeline 202, a wellhead 209, water inlet 203, a gas injection pipe 206, a sparger 207, a mixer 208 and an outer water injection pipe 204. The $CO_2$ is conducted to the wellhead 209 under high pressure and into the injection well 210 via the gas injection pipe 206 having an open end at a depth $h1 \geq 0$, but the injection pipe 206 is surrounded by an outer water injection pipe 204 having an open end positioned at depth $h1+h2$. In this embodiment, the amount of water (liters/second) pumped into the injection well 210 is controlled via a valve 211, where the water is pumped into the space between the injection pipe 206 and the outer water pipe 205.

The depth at the open of the injection pipe at depth $h1 \geq 0$ is selected such that the hydraulic pressure of the water at this depth is slightly less than the $CO_2$ gas pressure in the injection pipe. This is to ensure that the $CO_2$ gas can go into the water. Further downwards of the injection of the $CO_2$ gas into the water, i.e. at depth $h1+\Delta h$ with $\Delta h \ll h1$ the hydraulic pressure of the water is larger than the pressure of the dissolved $CO_2$. This is to ensure that the pressure of the dissolved $CO_2$ will be less than the hydraulic pressure so that it stays dissolved in the water.

The water flow velocity into the space between the injection pipe 206 and the outer pipe 204 is selected such that the flow velocity of the water as indicated by the arrows is larger than the upwardly velocity of the $CO_2$ gas bubbles due to the buoyant force on the $CO_2$ gas at the open end of the injection pipe. Hence, as $CO_2$ bubbles move downward, the hydraulic pressure increases, $CO_2$ dissolves into the water and bubbles become smaller resulting in reduced upward velocity of the bubbles. A preferred condition is when the bubbles are small since then the upward travelling velocity of the bubbles is small and also the total surface area is larger resulting in enhanced dissolution rate.

Figure 7:
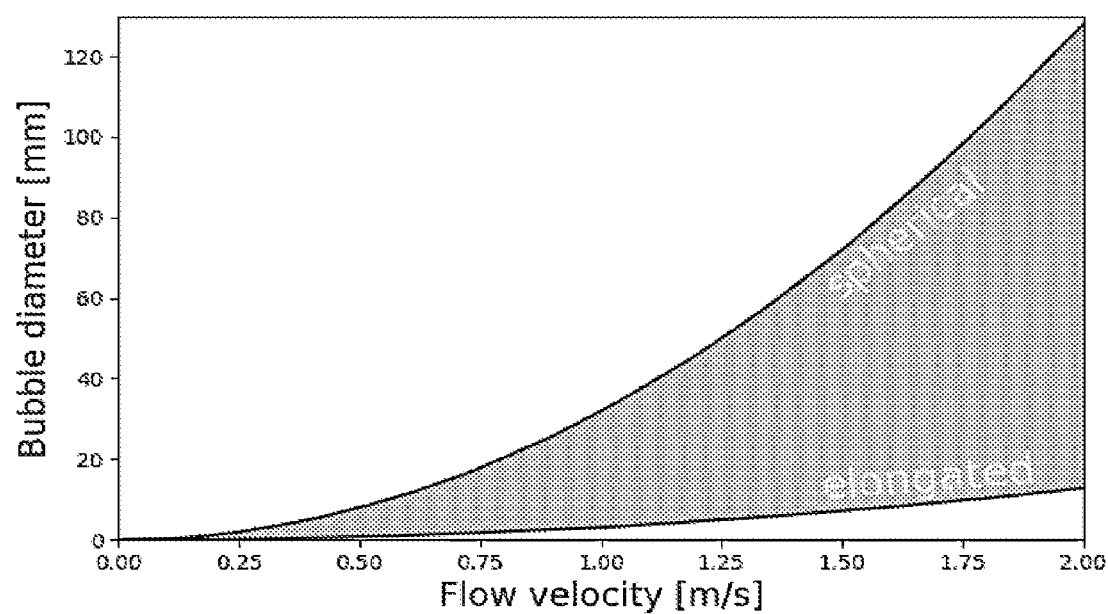
FIG. 7 shows the relation between the downward flow velocity (m/s) of water into an injection well and the diameter of spherical (upper line) and elongated (lower line) gas bubbles where the buoyancy and downward drag force are in a balance at a given temperature, pressure and gas and water compositions. The shaded area represents bubbles with a form between spherical and elongated. As is clear from this figure, means capable of creating small bubbles will result in a method or system according to the present invention (i.e. being at least in balance) being capable of operation at relatively low flow velocities, e.g. below 0.4 m/s, whereas means limited to larger bubbles will necessitate a means capable of providing higher flow velocities, e.g. above 0.8 m/s, in order to be able to provide a method or system according to the present invention (i.e. being in balance).
Figure 8:
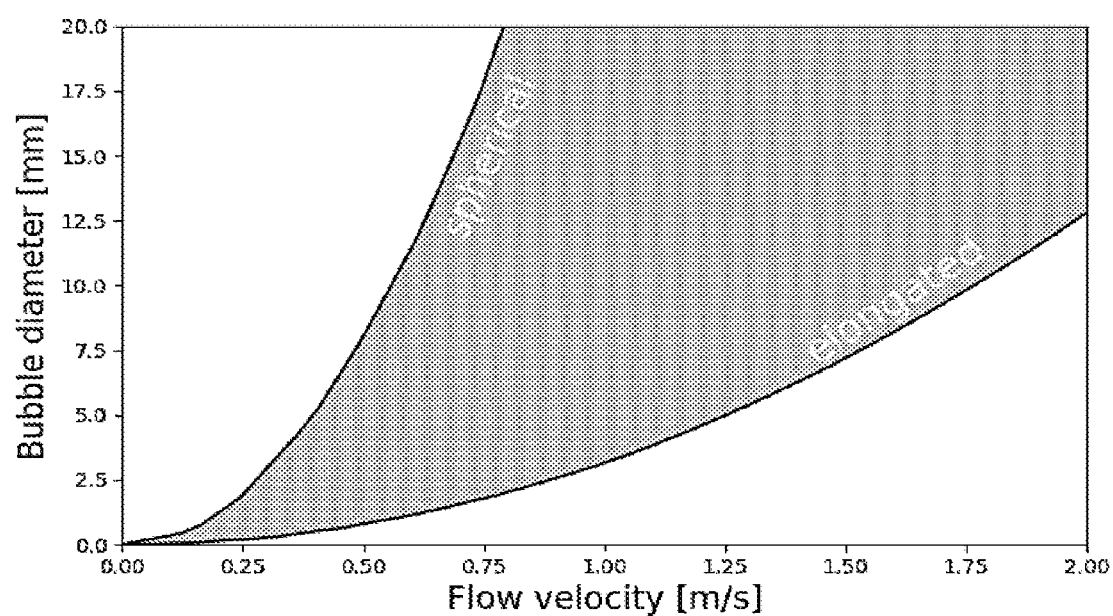
FIG. 8 shows an expanded view of the first quarter of FIG. 7.

One way to analyze the water flow velocity needed down the pipe to avoid spherical gas bubbles from rising up the injection pipe is to calculate when the buoyancy of the gas bubbles, with the density of the carbon dioxide bubbles, at the relevant pressure and temperature (in the form of perfect sphere) is equal to the drag force at the downward flow velocity of the water. At these conditions the spherical gas bubbles would be stationary. If the flow velocity would be less the bubbles would travel upwards and if the flow velocity would be higher the bubbles would travel downwards with the water flow. The results of the calculations are shown in FIGS. 7 and 8. The horizontal axis shows the downward flow velocity of the water in m/s and the vertical axis shows the diameter of the bubble in mm. As the gas bubbles are not solid spheres they can deform and will become oblate spheroids in a flowing medium. This applies especially for the larger gas bubbles as the surface tension will keep the smaller ones more spherical. Methods or systems working with relatively small bubbles, e.g. below 6 mm in diameter, will according to the present invention be capable of operation at relatively low flow velocities, e.g. below 0.4 m/s, whereas methods or systems working with relatively large bubbles, e.g. above 20 mm in diameter, will according to the present invention be capable of operation at relatively high flow velocities, e.g. above 0.8 m/s.

Referring back to FIG. 4, the sparger 207 is placed at the open end of the injection pipe 206 for maximizing the interfacial area between the $CO_2$ gas and the water. By doing so, the $CO_2$ gas bubbles will be equally distributed within the water, and further, the average diameter of the bubbles will be reduced causing said maximization of the interfacial area between the $CO_2$ gas and the water.

Below the sparger is the mixer 208, the role of which is to mix the dissolved $CO_2$ with the water so as to obtain a uniform mixing and dissolve any remaining $CO_2$ gas bubbles in the water. Accordingly, more turbulence will be created, which will enhance the dissolution of $CO_2$ gas further. Also, large $CO_2$ gas bubbles will be split into smaller gas bubbles, which will also enhance the dissolution rate of the $CO_2$.

In one embodiment, the depth h1 of the water column within the outer pipe is around 250 m meaning that the hydraulic pressure becomes 24.5 bars. This means that the pressure of the $CO_2$ gas is slightly larger than 24.5 bars. As soon as it leaves the open end of the injection pipe 206 and passes the sparger 207 it will be dispersed as small bubbles and thereafter dissolved in the water. Due to the constant water flow into the space between the injection pipe and the outer pipe 204 a vertical downwardly pointing velocity is created causing the dissolved $CO_2$ to travel towards the open end of the injection pipe at said depth of h1+h2. This depth is preferably selected such that the pH value of the dissolved $CO_2$ will be around 3.2, but the pH value decreases with increasing $CO_2$ pressure. This corresponds when h1+h2≈520 m. It is at this depth that the dissolved $CO_2$ leaves the system 200 and the sequestration of the $CO_2$ in basaltic rocks starts. The lower the pH value is, the higher will be the dissolution rate be within the basaltic rock.

An additional advantage of the present invention is its cost relative to conventional technologies. The overall "on site cost" of this gas mixture capture, transport and storage at the CarbFix2 Hellisheidi site is US $24.8/ton of gas mixture $CO_2/H_2S$. This is significantly lower than the price (USD 35 to USD 143 pr. ton $CO_2$) that has been reported by others (Ref 12: *Global CCS Institute*; Ref. 13: Rubin et al; Ref. 14: HU and Zhai, Ref. 16: Sigfusson et al; Ref. 17: Gunnarsson et al). This study has demonstrated the efficiency and cost advantages of the capture and storage of mixed, dissolved gas streams at the deep geological sites.

While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Referring to the accompanying figures the present invention in particular relates to a method of abating carbon dioxide ($CO_2$) and/or hydrogen sulfide ($H_2S$), comprising the steps of:
  pumping or transferring water from a water source into an outer pipe (205) of an injection well (210) thereby creating a pressurized water stream in said outer pipe (205),
  pumping a $CO_2$ and/or $H_2S$ rich gas into a gas injection pipe (206) of an injection well (210) thereby creating a $CO_2$ and/or $H_2S$ rich gas stream comprising pressurized $CO_2$, and/or pressurized $H_2$, in said injection pipe (206)
  dissolving substantially all of said pressurized $CO_2$ and/or $H_2S$ gas of said $CO_2$ and/or $H_2S$ rich gas stream in said pressurized water stream by merging said pressurized water stream and said $CO_2$ and/or $H_2S$ rich gas stream at a depth, h1≥0, where the hydraulic pressure of said water in said outer pipe (205), p(W), is lower than the pressure of said $CO_2$ and/or $H_2S$, p(C) and/or p(H), in said injection pipe (206)
  keeping said dissolved $CO_2$ and/or $H_2S$ in solution in said water stream by transferring said water stream from said depth h1≥0 to a depth h1+h2, where (h1+h2)>h1, at a downward flow velocity, v(W), which at h1+h2 is higher than the upward flow velocity of said $CO_2$ and/or $H_2S$ gas, v(C) and/or v(H), resulting from the buoyant force on bubbles of $CO_2$ and/or $H_2S$ gas in said water stream at said depth h1+h2
  injecting said pressurized water stream comprising dissolved $CO_2$ and/or $H_2S$ into a geological reservoir comprising reactive rocks at h1+h2 or at a depth>(h1+h2).

In a particular preferred embodiment of a method according to the invention the geological reservoir is a geothermal reservoir.

In a particular preferred embodiment of a method according to the invention the interfacial area between the $CO_2$ and/or $H_2S$ to be dissolved in said water stream is increased by fitting said injection pipe (206) with a means for sparging (207) at the merging point at depth h1.

In a further particularly preferred embodiment of a method according to the invention said depth h1 is about 250-750 m, such as 250-600 m or 400-750 m, such as 300-600 m or 500-750 m.

In a further particularly preferred embodiment of a method according to the invention said downward flow velocity of said water, v(W), is 0.5-1 m/s, such as 0.6-0.9 m/s, e.g. 0.65-0.85 m/s, such as e.g. 0.7 m/s.

In a further particularly preferred embodiment of a method according to the invention said injection pipe (206) extends downwardly inside said outer pipe (205), comprising said pressurized water stream, and has an open end at said depth h1≥0.

In a yet further particularly preferred embodiment of a method according to the invention said outer pipe (205), comprising said pressurized water stream, has an open end at said depth h1+h2.

In a yet further particularly preferred embodiment of a method according to the invention the pressure of $CO_2$, p(CO$_2$), at the merging point at depth h1≥0 is between about 15-40 bar, such as 17-38 bar, e.g. 20-36 bar, preferably between about 22-34 bar, more preferably between about 24-32 bar, most preferably about 24.5 bar.

In a yet further particularly preferred embodiment of a method according to the invention the pressure of $H_2S$, (pH), at the merging point at depth h1≥0 is between about 3-9 bar, such as between 4-8 bar, preferably between about 5-7 bar, more preferably between about 5.5-6.5 bar, such as between 5.6 and 6.4, e.g. 5.7 and 6.3 bar and most preferably about 6 bar.

In a yet further particularly preferred embodiment of a method according to the invention the resulting pH value of said pressurized water stream containing said dissolved $CO_2$ and or $H_2S$ is between about 1 and 5, such as between about 2 and 4, preferably between about 2.5 and 3.5, such as between about 2.6 and 3.4, more preferably about between 2.7 and 3.3, such as 3.2.

In a yet further particularly preferred embodiment of a method according to the invention, the method further comprises the steps of:
  dissolving a tracer substance, in a predetermined molar ratio compared to said dissolved $CO_2$ and/or $H_2S$, in said pressurized water stream at said depth h1≥0 in said outer pipe (205) in said injection well (210/612), establishing a monitoring well (610) being interlinked to said outer pipe (205) of said injection well (210/612) via a flow path (614), whereby at least a part of said pressurized water mixed with said dissolved $CO_2$ and/or $H_2S$ and said tracer substance flows from said outer pipe (205) of said injection well (210/612) to said monitoring well (610) via said flow path (614), measuring the concentration of $CO_2$ and/or $H_2S$ and tracer substance at said monitoring well (610) and establishing based thereon the molar ratio between $CO_2$ and/or $H_2S$ and tracer substance at said monitoring well (610), and determining an abatement indicator indicating the degree of $CO_2$ and/or $H_2S$ abatement based on comparing the molar ratio between $CO_2$ and/or $H_2S$ and the tracer substance at said monitoring well (610) with said predetermined molar ratio in said pressurized water stream at said depth h1 in said outer pipe (205) in said injection well (210/612).

Referring to the accompanying figures the present invention furthermore in particular relates to a system for abating carbon dioxide ($CO_2$) and/or hydrogen sulfide ($H_2S$), comprising:

an injection well (210)

an outer pipe (205) extending downwardly inside said injection well (210)

an injection pipe (206) extending downwardly inside said injection well (210) means for pumping or transferring water from a water source into said outer pipe (205) thereby creating a pressurized water stream in said outer pipe (205), means for pumping a $CO_2$ and/or $H_2S$ rich gas into said injection pipe (206) thereby creating a $CO_2$ and/or $H_2S$ rich gas stream comprising pressurized $CO_2$, and/or pressurized $H_2$, in said injection pipe (206)

means for merging said pressurized water stream and said $CO_2$ and/or $H_2S$ rich gas stream at a depth, h1≥0, where the hydraulic pressure of said water in said outer pipe (205), p(W), is lower than the pressure of said $CO_2$ and/or $H_2S$, p(C) and/or p(H), in said injection pipe (206)

means for transferring said water stream from said depth h1≥0 to a depth h1+h2, where (h1+h2)>h1, at a downward flow velocity, v(W), which at h1+h2 is higher than the upward flow velocity of said $CO_2$ and/or $H_2S$ gas, v(C) and/or v(H), resulting from the buoyant force on bubbles of $CO_2$ and/or $H_2S$ gas in said water stream at said depth h1+h2 means for keeping the resulting pH value of said pressurized water stream containing said dissolved $CO_2$ and or $H_2S$ between about 2 and 4, preferably between about 2.5 and 3.5, more preferably about 3.2 means for injecting said pressurized water stream comprising dissolved $CO_2$ and/or $H_2S$ into a geological reservoir comprising reactive rocks at h1+h2 or at a depth>(h1+h2).

In a particular preferred embodiment of a system according to the present invention the system further comprises means for sparging (207) fitted onto said injection pipe (206) at the merging point at depth h1≥0.

In a further particularly preferred embodiment of a system according to the invention said depth h1≥0 is about 250-750 m, such as 250-600 m or 400-750 m, such as 300-600 m or 500-750 m.

In a further particularly preferred embodiment of a system according to the invention said means for transferring said water stream from said depth h1 to a depth h1+h2, where (h1+h2)>h1, is capable of providing a downward flow velocity of said water, v(W), which is 0.5-1 m/s, such as 0.6-0.9 m/s, e.g. 0.65-0.85 m/s, such as e.g. 0.7 m/s.

In a further particularly preferred embodiment of a system according to the present invention said injection pipe (206) extends down into said outer pipe (205) and has an open end at said depth h1≥0.

In a yet further particularly preferred embodiment of a system according to the present invention said outer pipe (205) has an open end at said depth h1+h2.

In a yet further particularly preferred embodiment of a system according to the present invention, the system further comprises:

means for dissolving a tracer substance, in a predetermined molar ratio compared to said dissolved $CO_2$ and/or $H_2S$, in said pressurized water stream at said depth h1≥0 in said outer pipe (205) in said injection well (210/612), a monitoring well (610)

a flow path (614), whereby at least a part of said pressurized water mixed with said dissolved $CO_2$ and/or $H_2S$ and said tracer substance flows from said outer pipe (205) of said injection well (210/612) to said monitoring well (610), means for measuring the concentration of $CO_2$ and/or $H_2S$ and tracer substance at said monitoring well (610) and establishing based thereon the molar ratio between $CO_2$ and/or $H_2S$ and tracer substance at said monitoring well (610), and means for determining an abatement indicator indicating the degree of $CO_2$ and/or $H_2S$ abatement based on comparing the molar ratio between $CO_2$ and/or $H_2S$ and the tracer substance at said monitoring well (610) with said predetermined molar ratio in said pressurized water stream at said depth h1 in said outer pipe (205) in said injection well (210/612).

The methods and systems according to the present invention may be further illustrated by way of the following examples.

Example 1

0.07 kg/s of $CO_2$ comes from the gas purification unit or a gas separation station of a geothermal power plant. The initial pressure of the gas is 30 bar. For the transportation of the gas to the injection well a pipe is selected with outer diameter (OD) 40 mm, resulting in a pressure drop of 1.45 bar. Including other pressure losses it is assumed that the pressure at the well head is 28 bar. For the injection a pipe with OD 32 mm is selected resulting in pressure drop of 0.41 bar, but due to gravity the pressure head at the merging point will increase by 1.1 bar and the pressure at the merging point will be 28.6 bar.

The injection pipe is a pipe with OD 75 mm and needs a volumetric flow rate of 1.94 kg/s of water to dissolve the gaseous carbon dioxide. The pressure drop under those conditions is 0.51 bar/100 m. Therefore, the water column in the injection pipe will be approximately 13 m above the water level in the well due to the pressure drop down to the merging point. It is not necessary to change the location of the merging point due to this increased pressure. However, the water column in the pipe will rise further by approximately 15 m due to pressure drop in the pipe below the merging point and therefore the merging point must be elevated accordingly. Thus, the water level will be approximately 28 m above the water level in the well. To have 25 bar pressure at the merging point it must be 255 m below the water level in the pipe or 227 m below the water level in the well.

Under those conditions the pressure drop in the merging can be up to 3.6 bar. The water downward flow velocity at the merging point will be approximately 0.95 m/s. The same procedure was applied with lower water flow rate at 1.73 kg/s resulting in downward flowing velocity at the merging point of 0.85 m/s. This lower flow rate, however, prevented an efficient downward movement of all gas bubbles resulting in untimely shutdown of the process. If the inner diameter of the water pipe is diminished at the merging point, a sufficient downward water flowing velocity can be achieved even at the reduced water flow rate of 1.73 kg/s ensuring full dissolution of the gas bubbles. Such a design will reduce the water demand of this gas abatement method.

Example 2

In this example, the partial pressure of carbon dioxide is selected to be 25 bar downhole. This means saturation at 25 bar pressure or 36 g $CO_2$ pr. kg water at 17° C. At this temperature and pressure the volume of carbon dioxide is approximately 20 times the volume of the equivalent mass of water at atmospheric pressure. For the water to be able to pull the gas downwardly, the volume of the gas should not exceed the volume of the water, preferably be much smaller. For the water to be able to bring the gas downward in the pipe, the water pressure at the gas release point (merging point) should preferably be near the saturation pressure of 25 bar. If however a sufficient volumetric water flow rate is maintained it is possible to have the pressure lower. Part of the gas will dissolve in the water and the remaining gas will form small bubbles and travel with the water down the pipe. As the depth increases the bubbles become smaller as the pressure increases and the gas continues to dissolve in the water until all the gas has been dissolved.

Example 3

Figure 10:
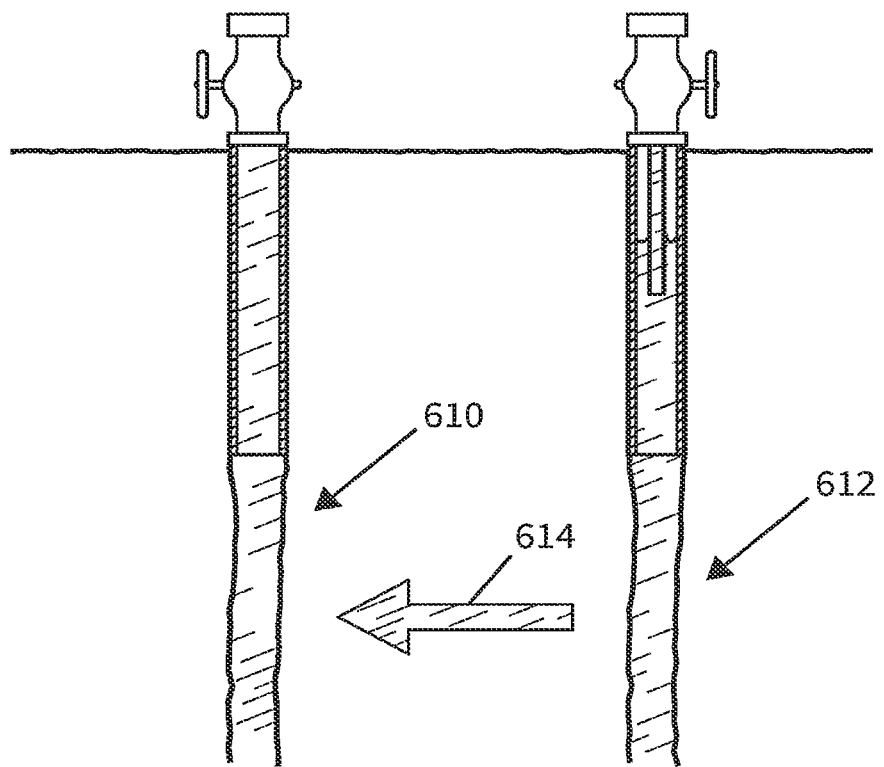

In this embodiment, shown in FIG. 10, a monitoring well 610 is interlinked to the injection well 612 via a flow path 614, which may e.g. be a fracture in the geological reservoir. The implementation of this monitoring well 610 is to estimate the mineralization capacity of the $CO_2$. The step of estimating comprises using one or more tracer substances for tracing the $CO_2$ gas, or the water, or the carbon. Thus, one or more types of tracers may be added via an appropriate tracer source for tracing one or more of these in a controllable way such that the molar ratio between the $CO_2$ gas, or the water, or the carbon, and the tracer substance(s) is pre-determined, i.e. the molar ratio is prefixed. This means that only one tracer can be used for tracing e.g. only $CO_2$, or only C, or only water, or a combination thereof. As an example, $SF_5CF_3$ tracer, $SF_6$ tracer or Rhodamine tracer may be implemented to track the dilution between the injected fluid and the ambient water in the reservoir as well as to characterize the advective and dispersive transport of the $CO_2$ saturated solution in the storage reservoir. C-14 tracer concentration injected with the $CO_2$ can on the other hand change as a result of CCE-water-rock interaction and therefore allows for estimation the degree of mineralization for the injected $CO_2$ in turns of mass balance calculations. A monitoring equipment may be provided (not shown here) for monitoring the molar ratio between the $CO_2$ gas, or the water, or the carbon, and the tracer substance(s) in this monitoring well 610 as a consequence of injecting said dissolved $CO_2$. As already mentioned, the monitoring well 610 is interlinked to the injection well 612 via said flow path such that at least a part of the injected water mixed with the dissolved $CO_2$ and said tracer substance(s) flows to the monitoring well 610 via said flow path 614. By comparing the molar ratio at the monitoring well 610 and the injection well 612 an abatement indicator can be determined indicating the amount of $CO_2$ sequestration via water-rock reactions. Accordingly, if the tracer used is $SF_5CF_3$ tracer and the molar ratio between $[SF_5CF_3]/[CO_2]$ is 1 at the injection well 612 but 2 at the monitoring well 610, this would clearly indicate that half of the $CO_2$ has been subjected to chemical reactions with the rock via said water-rock reactions.

Such a monitoring well 610 may just as well be implemented in relation to the embodiment shown in FIG. 4.

Example 4

Figure 5:
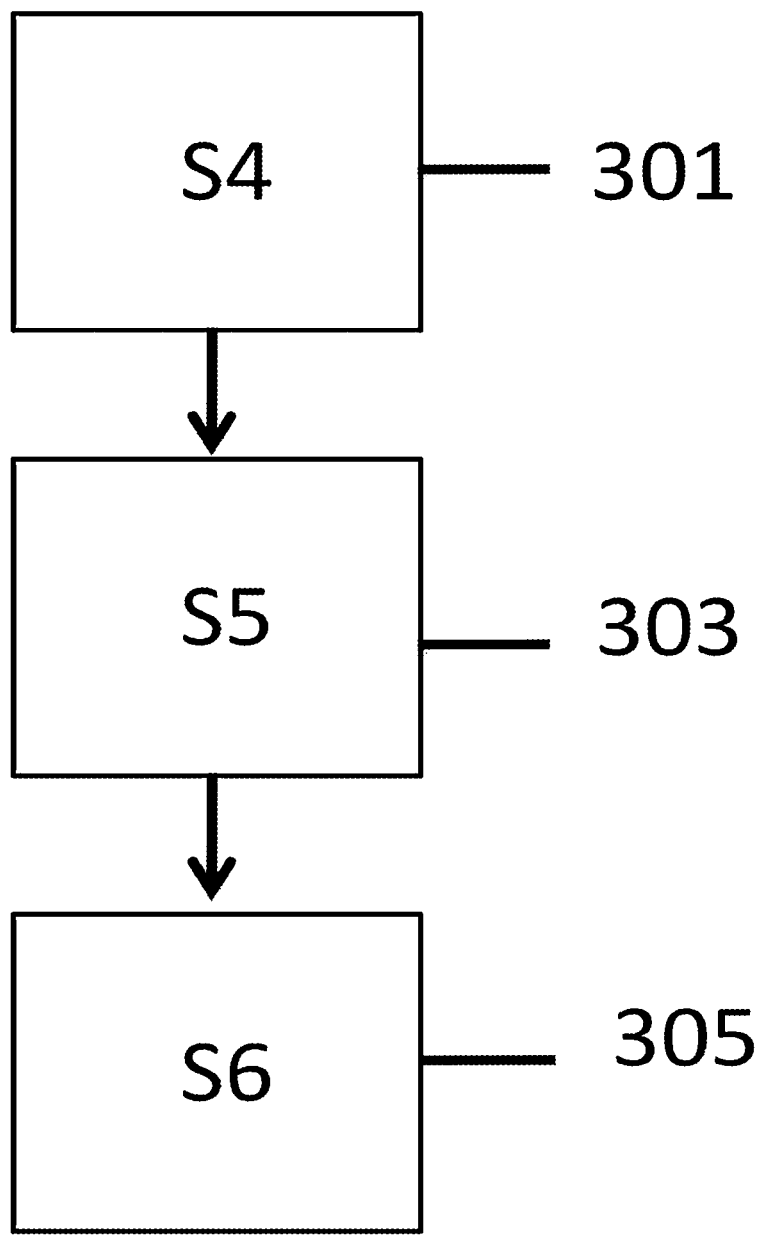
FIG. 5 shows a flowchart of an embodiment of a method according to the present invention of abating hydrogen sulfide ($H_2S$) in a geological reservoir.

FIG. 5 shows one embodiment of a method according to the present invention of abating hydrogen sulfide in a geothermal reservoir, where the mineralization capacity of the $H_2S$ is estimated. This method may either occur prior to said method steps in FIG. 1 or be implemented as a monitoring method performed at some later time.

In step (S4) 301, a tracer substance such as KI is dissolved in addition to the dissolved $H_2S$ in a controllable way so that the molar ratio between $H_2S$ and the tracer substance will be pre-determined.

In step (S5) 303, a monitoring is performed, in response to injecting the dissolved $H_2S$ and the dissolved tracer substance into the injection well, of the molar ratio between the $H_2S$ and the tracer substance in a monitoring well. This monitoring is a well that is interlinked to the injection well via a flow path such as cracks or fracture in the rock such that at least a part of the injected water mixed with said dissolved $H_2S$ as said tracer substance flows to the monitoring well via this flow path. This monitoring includes then measuring the concentration of the $H_2S$ and the tracer substance and based thereon the molar ratio between the $H_2S$ and the tracer substance at the monitoring well.

In step (S6) 305, an abatement indicator is determined indicating the amount of $H_2S$ abatement via water-rock reactions based on comparing the molar ratio between the $H_2S$ and the tracer substance at the monitoring well with the corresponding molar ratio at the injection well. For example if the $H_2S$/tracer molar ratio that goes into the injection well is 1.0 but 0.5 at the monitoring well, this would indicate that half of the dissolved $H_2S$ becomes mineralized in the geothermal reservoir via water-rock reactions. However, to improve the method even further, it would be preferred to perform a correction taking into account oxidation of $H_2S$ to other sulfur species, which could cause uncertainty.

Example 5

Figure 6A:
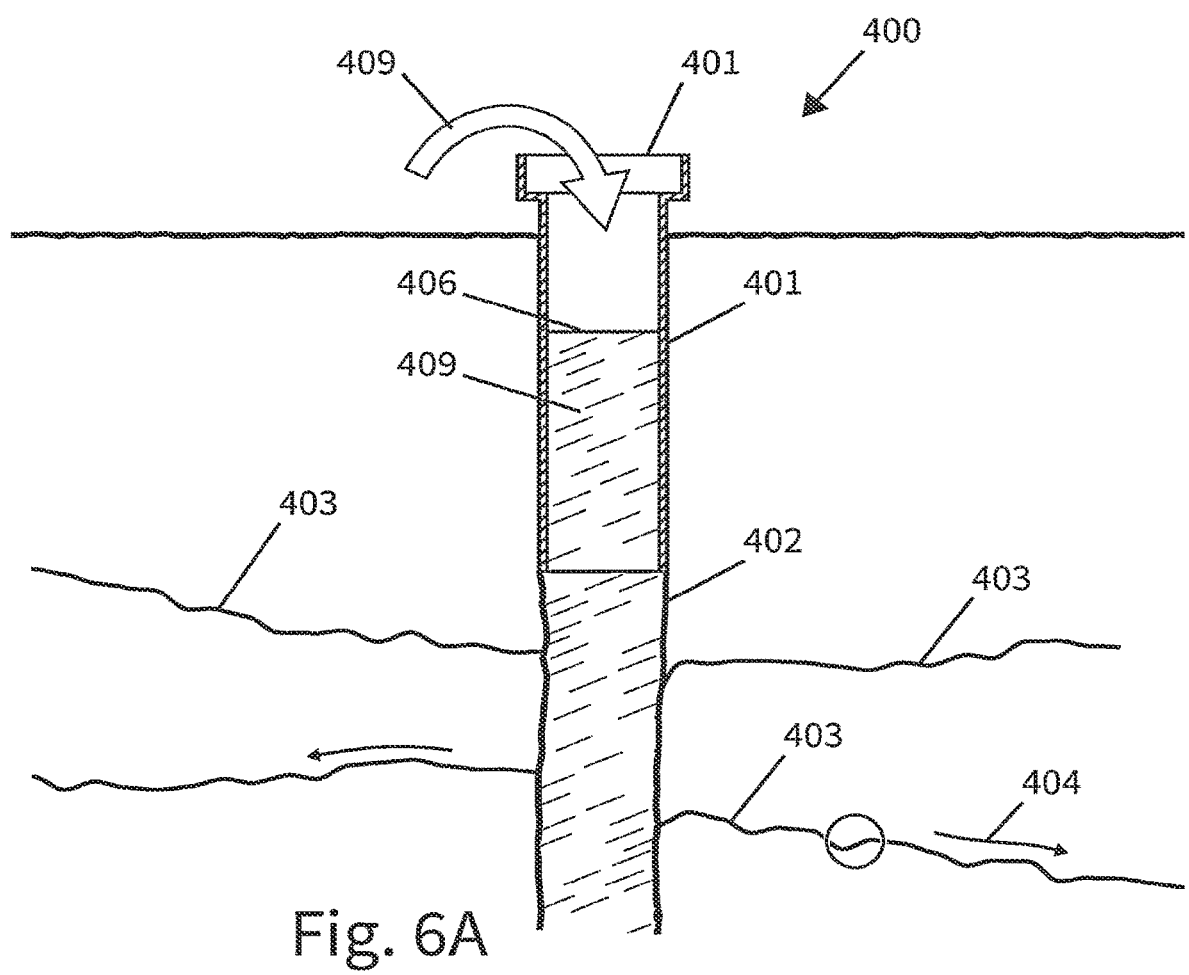
FIG. 6 depicts schematically a method in accordance with the present invention showing an injection well where water is continuously being pumped into the well.
Figure 6B:
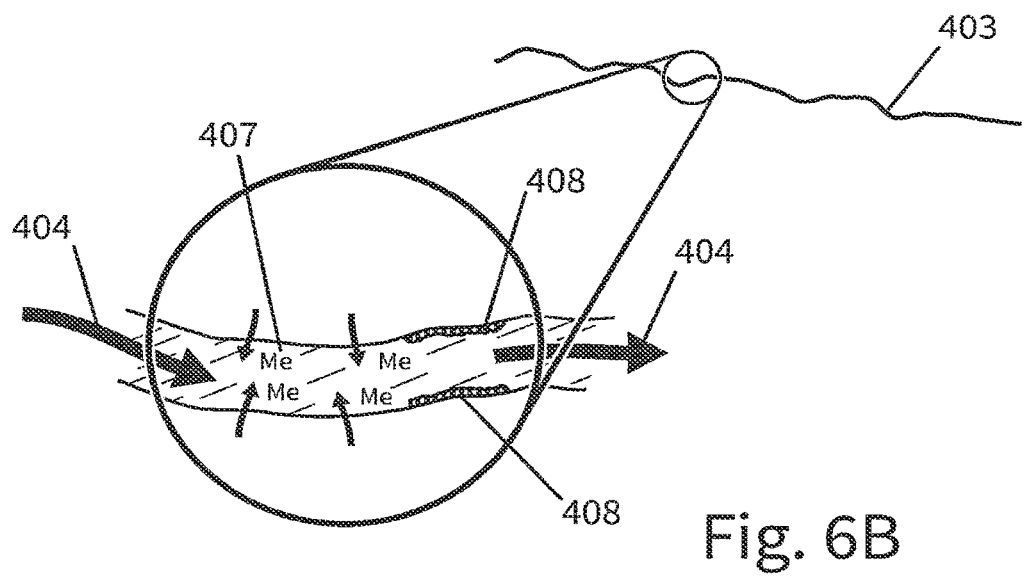

FIG. 6A depicts schematically the method in FIG. 5 showing an injection well 400 where water 409 is continuously being pumped into the well 400. The total depth of such a well can be several kilometers. As shown here, the well is partly filled with water, where the water surface 406 is close to the closing cap of the casing 401 of the injection well. Due to continuous pumping of water, a water stream is formed in the well extending downward into the hole, where some of the water will flow into the geothermal reservoir 403 in a direction as indicated by the arrow 404. As depicted here, the injection well includes a casing 401 such as a steel pipe which seals the well (e.g. seals it from fresh groundwater above the geothermal reservoir). The height of such a casing 401 can vary from a few hundred meters up to more than 1000 meters. As shown here, the remaining part of the injection well is in the rock 402. The water-rock reactions that occur in the geothermal reservoir is indicated in the expanded view in FIG. 6B showing a flow path of the dissolved H₂S in the rock, where the dissolved H₂S reacts chemically with metal ions (Me) 407 in rock and forms Me sulfides 408. If e.g. the Me is Fe the Me sulfide will be Fe-sulfide.

The temperature of the water 409 being pumped into the well will, if the water source is a geothermal well, typically be around 100° C., but preferably it is colder since then less water would be needed to dissolve the H₂S than with hot water. This, however, depends on the water source, i.e. whether a fresh water source is being used (cold water) instead of geothermal water source.

Example 6

Figure 9:
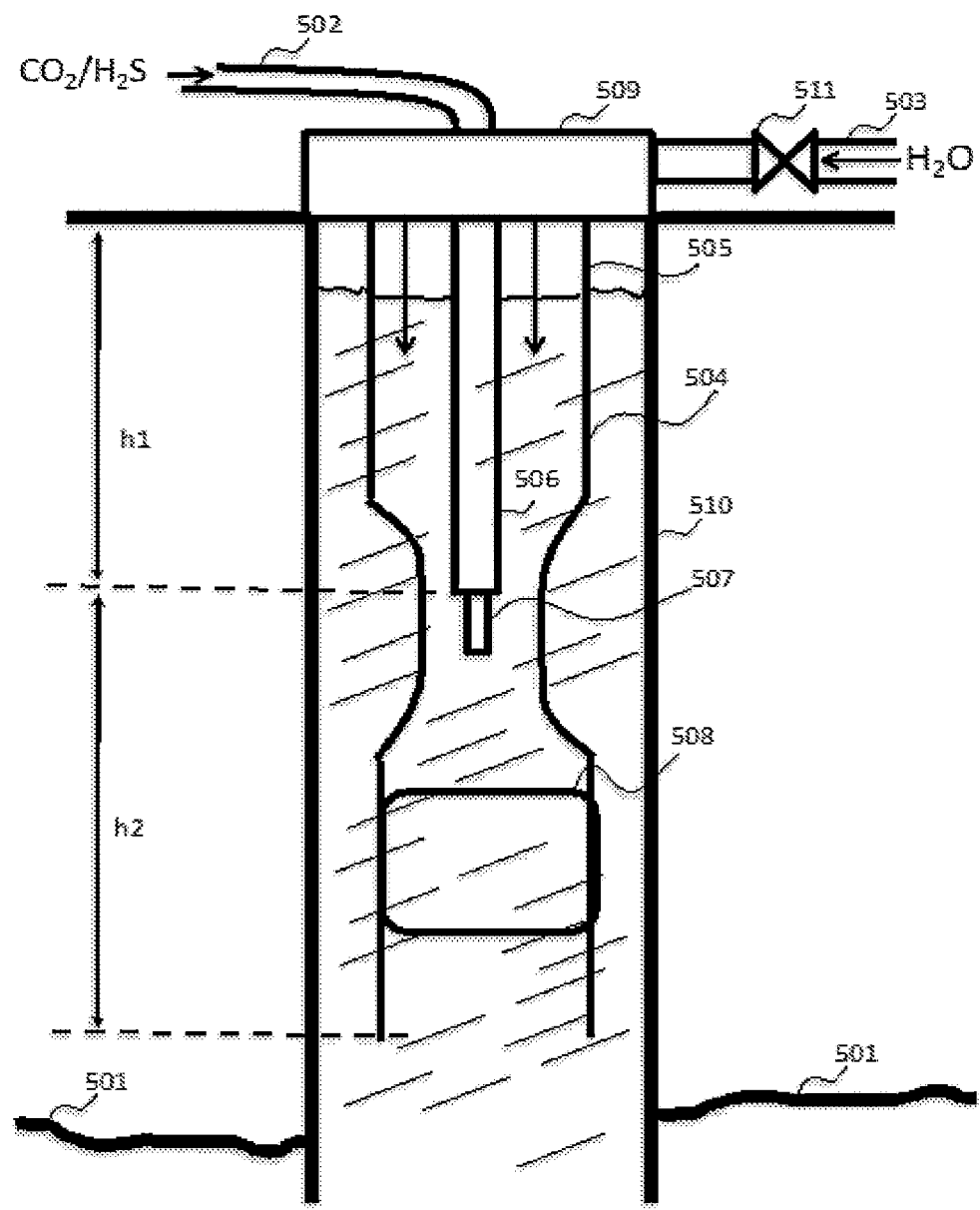
FIGS. 9-11 depicts graphically different embodiments of a system according to the present invention for abating hydrogen sulfide ($H_2S$) and carbon dioxide ($CO_2$), in a geological reservoir.

FIG. 9 depicts graphically an embodiment of a system according to the present invention for abating hydrogen sulfide (H₂S) in a geothermal reservoir 501. The system comprises a H₂S gas pipeline 502, a wellhead 509, water inlet 503, an injection pipe 506, a sparger 507, a mixer 508 and an outer pipe 504. The H₂S is conducted to the wellhead 509 under high pressure and into the injection well 510 via the injection pipe 506 having an open end at a depth hi>0, but the injection pipe 506 is surrounded by an outer pipe 504 having an open end positioned at depth h1+h2. In this embodiment, the volumetric flow rate of water (liters/second) into the injection well 510 is controlled via a valve 511, where the water is pumped into the space between the injection pipe 506 and the outer pipe 505.

The depth at the open of the injection pipe at depth h1 is selected such that the hydraulic pressure of the water at this depth is slightly less than the H₂S gas pressure in the injection pipe. This is to ensure that the H₂S gas can go into the water. Below the site of the injection of the H₂S gas at depth h1+Δh with Δh«h1 the hydraulic pressure of the water is larger than the internal pressure of the dissolved H₂S.

The water flow into the space between the injection pipe 506 and the outer pipe 504 is selected such that the volumetric flow rate and hence velocity of the water (as indicated by the arrows) is larger than the upwardly pointing velocity of the H₂S gas due to the buoyant force on the H₂S gas at the open end of the injection pipe. Hence, as H₂S bubbles move downward, the hydraulic pressure increases and bubbles become smaller resulting in reduced upward pointing velocity of the bubbles. A preferred condition is when the bubbles are small since then the upward travelling velocity of the bubbles is small and also the total surface area is larger resulting in enhanced dissolution rate.

In this embodiment, the sparger 507 is placed at the open end of the injection pipe 506 for maximizing the interfacial area between the H₂S gas and the water. By doing so, the H₂S gas bubbles will be equally distributed within the water, and further, the average diameter of the bubbles will be reduced causing said maximization of the interfacial area between the H₂S gas and the water.

Below the sparger is the mixer 508. The role of the mixer is to mix the dissolved H₂S with the water so as to obtain a uniform mixing of the H₂S gas in the water and dissolving any remaining H₂S gas bubbles in the water. Accordingly, more turbulence will be created, which will enhance the dissolution rate of H₂S gas further. Also, large H₂S gas bubbles will be split into smaller gas bubbles, which will also enhance the dissolution rate of the H₂S.

Example 7

FIG. 10 depicts graphically another embodiment of a system according to the present invention for abating inter alia hydrogen sulfide (H₂S) in a geothermal reservoir. In this embodiment, a monitoring well 610 is interlinked to the injection well 612 via a flow path 614, which may e.g. be a fracture in the geothermal reservoir. The implementation of this monitoring well 610 is to estimate the mineralization capacity of the H₂S as discussed previously in relation to FIG. 5.

Example 8

Figure 11:
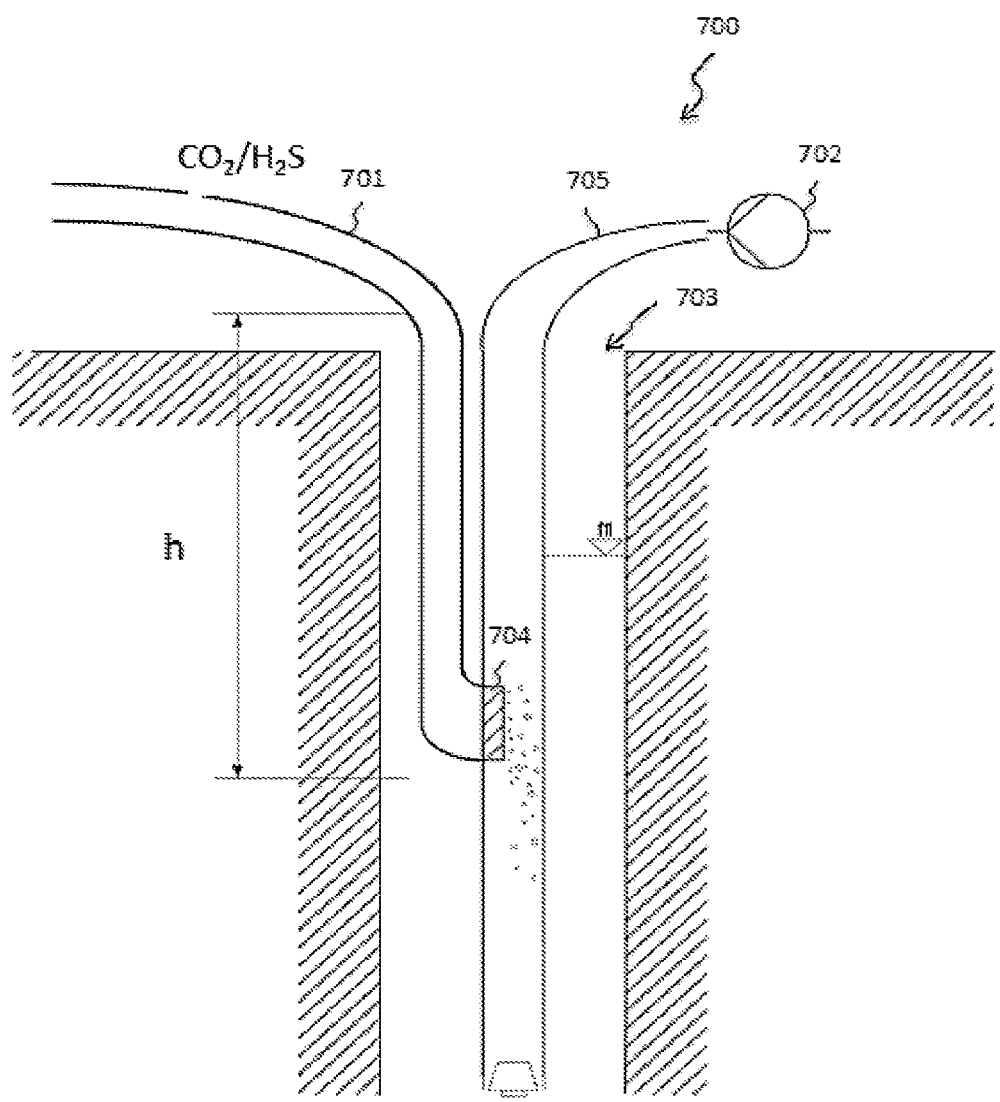

FIG. 11 depicts graphically yet another embodiment of a system 700 according to the present invention for abating hydrogen sulfide (H₂S) in a geothermal reservoir. In this embodiment the H₂S is transferred down to the injection well 703 in a separate pipe 701 outside the water injection pipe 705. Since the pipe is fastened at the wellhead (not shown here) the depth of the merging point cannot be changed if conditions change such as changed forward water flow "fff" (designated by an arrow and corresponding initials in FIG. 11). It is thus preferred to implement a pressure control valve 702 at the end of the injection pipe 705 to maintain a constant pressure at the merging point 704. The advantage of this solution is lower pressure drop in the injection pipe and therefore higher water flow rate can be maintained which makes it easier to pull the gas bubbles down the pipe.

Example 9

A significant part of the security risk associated with geologic carbon storage occurs because gaseous $CO_2$ is prone to escape back to the surface and leak into the atmosphere or into overlying fresh-water aquifers. This is particularly problematic when the storage is attempted in porous geological formations.

The present set of experiments were performed at the geothermal plant in Hellisheidi, Iceland. The rocks at the Hellisheidi injection site are of ultramafic to basaltic composition and highly permeable in both lateral and vertical directions (300 and $1700 \times 10^{-15}$ m², respectively) and an estimated 8,5% porosity.

Using a device as the one depicted in FIG. 4 $CO_2$ and $H_2O$ was injected at a target mass rate of 70 and 1940 g respectively. The $CO_2$ and $H_2O$ was released at a depth of 330-360 m. At this depth, $CO_2$ was released via a sparger in the form of small gas bobbles into the flowing $H_2O$. The $CO_2/H_2O$ mixture was carried from the sparger via a mixing pipe extending down to 540 m where it was released to the subsurface rocks. Approximately half the way (approximately at 420 m) a static mixer was located to aid $CO_2$ dissolution. Over a period of 3 months approximately 175 t of $CO_2$ together with approximately 5000 t $H_2O$ were injected into the subsurface at the site.

Verification of the complete dissolution of $CO_2$ during its injection was performed by digital downhole camera (showing no $CO_2$ bubbles and by high-pressure well water sampling using a custom made bailer.

Images show the well fluid to be void of gas bubbles consistent with the complete dissolution of $CO_2$ 1.5 m above the fluid outlet at 540 m.

12 well water samples were analyzed for total dissolved inorganic carbon and 6 of the 12 were measured for in-situ pH. In each case the dissolved inorganic carbon concentration of the sample fluid was on average within 5% of the 0.82±2% mol/kg concentration based on measured $CO_2$ and $H_2O$ mass flow rates into the well and the fluid pH was 3.89±0.1 confirming the complete dissolution of the $CO_2$ during its injection.

Thus if injected into the subsurface as a dissolved phase, $CO_2$ is far less likely to escape back to the atmosphere due to its lack of bubble-formation or buoyancy (Ref. 15: Gilfillan et al., 2009).

Example 10

A further experimental injection of $CO_2/H_2S$ was carried out with the following parameters:

|  | Water | $CO_2$ | $H_2S$ |
|---|---|---|---|
| Temperature (° C.) | 23 | 18 | 18 |
| Pressure at mixing point (bar-a) |  | 18 | 6 |
| Volume flow rate at atmospheric pressure (l) | 1.4 | 10.9 | 3.6 |
| Mass flow rate (g/s) | 1.4 | 27.4 | 7.1 |
| Water downward flow velocity above merging point (m/s) | 1.04 |  |  |
| Water downward flow velocity below merging point (m/s) | 0.65 |  |  |

In this example, the partial pressure of carbon dioxide and hydrogen sulphide was selected to be 18 bar and 6 bar downhole.

The pH value of the water with the dissolved $CO_2$ will decrease with increasing $CO_2$ pressure as this increases the $CO_2$ content of the water. In one experiment the depth was selected such that the pH value was around 3.2. This corresponded to a depth of 520 m. As is clear from the table above, the downward velocity of the water in this example was app. 0.7 m/s. Changing the downward velocity of the water to app. 0.3 m/s resulted in failure.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

REFERENCES

All of which are hereby incorporated in their entirety by reference.

Ref. 1: Broecker W. S., Kunzig, R., 2008. Fixing climate: what past climate changes reveal about the current threat—and how to counter it. Hill and Wang, New York; Oelkers, E. H., Cole, D Ref. 2: Barbier, E. (2002) Geothermal Energy Technology and Current Status: an Overview. Renewable and Sustainable Energy Reviews, 6, p. 3-65

Ref. 3: Arnórsson, S. (1995a) Hydrothermal systems in Iceland: Structure and conceptual models. 1. High-temperature areas. Geothermics 24, 561-602

Ref. 4: Arnórsson, S. (1995b) Hydrothermal systems in Iceland: Structure and conceptual models. 2. Low-temperature areas. Geothermics 24, 603-629

Ref. 5: Kerr, T. M., 2007. Legal aspects of storing CO2: update and recommendations. OECD/IEA Ref. 6: Hawkins, D. G., 2004. No exit: thinking about leakage from geologic carbon storage sites, Energy 29, 1571-1578

Ref. 7: Benson, S. M., Cole, D. R., 2008. CO2 sequestration in deep sedimentary formations. Elements 4, 325-331

Ref. 8: Mineral sequestration of carbon dioxide in basalt: A pre-injection overview of the CarbFix project; Gislason S R, Wolff-Boenisch D, Stefansson A, et al.; INTERNATIONAL JOURNAL OF GREENHOUSE GAS CONTROL, Vol. 4, Issue: 3, Pages: 537-545, Pub. May 2010

Ref. 9: Sanopoulos, D. and Karabelas A. (1997). $H_2S$ abatement in geothermal plants: Evaluation of Process Alternatives. Energy Sources, 19, 63-77)

Ref. 10: Hibara, Y., Araki, K., Tazaki, S. and Kondo, T. (1990) Recent technology of geothermal plants. Geothermal Resource Council Transactions 14, Part II: 1015-1024

Ref. 11: Oelkers, E., Gislason, S., 2001. The mechanism, rates and consequences of basaltic glass dissolution: I. an experimental study of the dissolution rates of basaltic glass as a function of aqueous al, si and oxalic acid concentrations at 25c and pH=3 and 11. Geochim. Cosmochim. Acta 65, 3671-3681

Ref. 12: Global CCS Institute (2011) Economic Assessment of Carbon Capture and Storage Technologies 2011 update Ref. 13: Rubin et al. (2015) Int. J. Greenh. Gas Control 40, 378-400

Ref. 14: Hu and Zhai (2017) Int. J. Greenh. Gas Control 65, 23-31

Ref. 15: Gilfillan et al. (2009) Nature 458, 614-618

Ref. 16: Sigfusson et al. (2015) Int. J. Greenh. Gas Control 37, 213-219

Ref. 17: Gunnarson et al (2018) Int. J. Greenh. Gas Control 79, 117-126

The invention claimed is:

1. A method for abatement of carbon from carbon dioxide ($CO_2$) and/or sulfur from hydrogen sulfide ($H_2S$) by mineralization and precipitation in a geological reservoir comprising reactive rocks thereby mitigating the need for venting carbon dioxide ($CO_2$) and/or hydrogen sulfide ($H_2S$) to the atmosphere, comprising:

pumping or transferring water from a water source into an outer pipe of an injection well, said outer pipe having an open end at a depth h1+h2, thereby creating a pressurized water stream in said outer pipe, pumping a $CO_2$ and/or $H_2S$ rich gas into an injection pipe extending downwardly into said injection well inside said outer pipe thereby creating a $CO_2$ and/or $H_2S$ rich gas stream comprising pressurized $CO_2$, and/or pressurized $H_2S$, in said injection pipe;

dissolving substantially all of said pressurized $CO_2$ and/or $H_2S$ gas of said $CO_2$ and/or $H_2S$ rich gas stream in said pressurized water stream by:

merging said pressurized water stream and said $CO_2$ and/or $H_2S$ rich gas stream in said outer pipe by providing said injection pipe with an open end at a depth, h1≥0, where the hydraulic pressure of said water in said outer pipe, p(W), is lower than the pressure of said $CO_2$ and/or $H_2S$, p($CO_2$) and/or p($H_2S$), in said injection pipe, and transferring said merged pressurized water and $CO_2$ and/or $H_2S$ rich gas streams from said depth h1≥0 to said open end of said outer pipe at said depth h1+h2, where (h1+h2)>h1, at a downward flow velocity, v(W), which relative to a point where the gasses are injected into the injection well, h1≥0, is as a minimum of between 0.4 m/s and 1.4 m/s and thereby ensures that for a given subpart of the water stream the hydraulic pressure of the water is larger than a sum of a partial pressure of the dissolved $CO_2$ and/or $H_2S$ after the gasses have been injected into the water and such that a drag force of the downward flowing water into the injection well is higher than an upward flow velocity of said $CO_2$ and/or $H_2S$ gas, $v(CO_2)$ and/or $v(H_2S)$, resulting from a buoyant force on bubbles of $CO_2$ and/or $H_2S$ gas in said water stream at said depth h1+h2, said bubbles having a diameter less than 6 mm;

keeping a pH of said pressurized water stream containing said dissolved $CO_2$ and/or $H_2S$ in said outer pipe between about 2 and 4 to promote dissolution of minerals and leaching of cations from said reactive rocks; and injecting said pressurized water stream comprising dissolved $CO_2$ and/or $H_2S$ in said outer pipe into said geological reservoir comprising said reactive rocks at the open end of said outer pipe at the depth h1+h2, or at a depth>(h1+h2)

thereby promoting dissolution of said minerals from said reactive rocks of said geological reservoir and providing said cations, necessary for carbon and sulfur mineralization and abatement of the carbon and sulfur of said dissolved carbon dioxide ($CO_2$) and/or hydrogen sulfide ($H_2S$) in said geological reservoir.

2. The method according to claim 1, wherein the geological reservoir is a geothermal reservoir.

3. The method according to claim 1, further including increasing an interfacial area between the $CO_2$ and/or $H_2S$ to be dissolved in said water stream by fitting said injection pipe with a means for sparging at a merging point at said depth h1≥0.

4. The method according to claim 1, wherein the pressure of said $CO_2$, $p(CO_2)$, at a merging point at said depth h1 is between about 20-36 bar.

5. The method according to claim 4, wherein $p(CO_2)$ at the merging point at depth h1 is between about 22-34 bar.

6. The method according to claim 1, wherein the pressure of said $H_2S$, $p(H_2S)$, at a merging point at said depth h1 is between about 4-8 bar.

7. The method according to claim 6, wherein $p(H_2S)$ at the merging point at depth h1 is between about 5-7 bar.

8. The method according to claim 1, further comprising:
dissolving a tracer substance, in a predetermined molar ratio compared to said dissolved $CO_2$ and/or $H_2S$, in said pressurized water stream at said depth h1≥0 in said outer pipe in said injection well, establishing a monitoring well being interlinked to said outer pipe of said injection well via a flow path, whereby at least a part of said pressurized water mixed with said dissolved $CO_2$ and/or $H_2S$ and said tracer substance flows from said outer pipe of said injection well to said monitoring well via said flow path, measuring a concentration of $CO_2$ and/or $H_2S$ and a tracer substance at said monitoring well and establishing based thereon a molar ratio between $CO_2$ and/or $H_2S$ and tracer substance at said monitoring well, and determining an abatement indicator indicating a degree of $CO_2$ and/or $H_2S$ abatement based on comparing the molar ratio between $CO_2$ and/or $H_2S$ and the tracer substance at said monitoring well with said predetermined molar ratio in said pressurized water stream at said depth h1 in said outer pipe in said injection well thereby determining to which extent said geological reservoir possesses the ability to store in mineralogical form the carbon and sulfur of said dissolved $CO_2$ and/or $H_2S$.

9. The method according to claim 1, wherein a pH of said pressurized water stream containing said dissolved $CO_2$ and/or $H_2S$ is between about 2.5 and 3.5.

* * * * *